United States Patent
Vaidya et al.

(10) Patent No.: US 6,187,129 B1
(45) Date of Patent: Feb. 13, 2001

(54) CURABLE TOPCOAT COMPOSITION AND METHODS FOR USE

(75) Inventors: Utpal R. Vaidya; Felix P. Shvartsman, both of Eden Prairie; Robert Sells, Minneapolis; Bryan L. Baab, Chaska, all of MN (US)

(73) Assignee: DataCard Corporation, Minnetonka, MN (US)

( * ) Notice: Under 35 U.S.C. 154(b), the term of this patent shall be extended for 0 days.

(21) Appl. No.: 09/372,321

(22) Filed: Aug. 11, 1999

Related U.S. Application Data

(60) Division of application No. 08/970,572, filed on Nov. 14, 1997, now Pat. No. 6,001,893, which is a continuation-in-part of application No. 08/649,105, filed on May 17, 1996, now abandoned.

(51) Int. Cl.[7] .......................... B32B 31/00; B32B 27/36; B32B 27/30; B32B 27/08; C08F 2/50
(52) U.S. Cl. ..................................... 156/275.5; 156/275.1; 428/483; 428/500; 428/575; 428/520; 428/411.1; 522/112; 522/121; 522/142; 522/182; 522/183; 427/516; 427/519; 430/9; 430/10; 430/14; 430/12
(58) Field of Search .................................... 428/483, 500, 428/515, 520, 411.1; 156/275.5, 275.1; 522/112, 121, 142, 182, 183; 427/516, 519; 430/9, 10, 14, 18

(56) References Cited

U.S. PATENT DOCUMENTS

| | | |
|---|---|---|
| 4,006,050 | 2/1977 | Hurst et al. . |
| 4,097,279 | 6/1978 | Whitehead . |
| 4,127,436 | 11/1978 | Friel . |
| 4,191,572 | 3/1980 | Cohen et al. . |
| 4,229,517 | 10/1980 | Bratt et al. . |
| 4,247,619 | 1/1981 | Cohen et al. . |
| 4,273,857 | 6/1981 | Laberzammer et al. . |
| 4,278,752 | 7/1981 | Gervay et al. . |
| 4,282,308 | 8/1981 | Cohen et al. . |
| 4,289,841 | 9/1981 | Cohen et al. . |
| 4,293,635 | 10/1981 | Flint et al. . |
| 4,303,924 | 12/1981 | Young, Jr. . |
| 4,304,839 | 12/1981 | Cohen et al. . |
| 4,316,951 | 2/1982 | Cohen et al. . |
| 4,326,010 | 4/1982 | Bauer . |
| 4,356,251 | 10/1982 | Cohen et al. . |
| 4,356,253 | 10/1982 | Buzzell . |
| 4,357,413 | 11/1982 | Cohen et al. . |
| 4,378,264 | 3/1983 | Pilette et al. . |
| 4,380,604 | 4/1983 | Neuhaus et al. . |
| 4,389,472 | 6/1983 | Neuhaus et al. . |
| 4,405,394 | 9/1983 | Cohen . |
| 4,426,431 | 1/1984 | Harasta et al. . |
| 4,427,764 | 1/1984 | Tachibana et al. . |
| 4,508,802 | 4/1985 | Heiart et al. . |
| 4,522,903 | 6/1985 | Heiart et al. . |
| 4,592,976 | 6/1986 | Whitehead . |
| 4,617,194 | 10/1986 | Scott et al. . |
| 4,619,876 | 10/1986 | Woodward . |
| 4,621,043 | 11/1986 | Gervay . |
| 4,668,601 | 5/1987 | Kistner . |
| 4,693,959 | 9/1987 | Ashcraft . |
| 4,698,294 | 10/1987 | Lau et al. . |
| 5,002,855 | 3/1991 | Fan et al. . |
| 5,045,435 | 9/1991 | Adams et al. . |
| 5,096,401 | 3/1992 | Tamura et al. . |
| 5,098,803 | 3/1992 | Monroe et al. . |
| 5,178,996 | 1/1993 | Kobayashi et al. . |
| 5,226,665 | 7/1993 | Huang . |
| 5,254,525 | 10/1993 | Nakajima et al. . |
| 5,279,689 | 1/1994 | Shvartsman . |
| 5,281,373 | 1/1994 | Tamura et al. . |
| 5,294,102 | 3/1994 | Ifkovtis, Jr. et al. . |
| 5,302,438 | 4/1994 | Komamura et al. . |
| 5,382,463 | 1/1995 | Adkins et al. . |
| 5,387,013 | 2/1995 | Yamauchi et al. . |
| 5,427,997 | 6/1995 | Oshima et al. . |
| 5,480,701 | 1/1996 | Hiroi . |
| 5,584,589 | 12/1996 | Adkins et al. . |
| 5,770,007 | 6/1998 | Czech et al. . |

FOREIGN PATENT DOCUMENTS

| | | |
|---|---|---|
| 39 32 460 A1 | 4/1990 | (DE) . |
| 0 031 521 A2 | 7/1981 | (EP) . |
| 0 156 493 A1 | 10/1985 | (EP) . |
| 0 430 282 B1 | 11/1990 | (EP) . |
| 0 405 582 A2 | 1/1991 | (EP) . |
| 677 397 A1 | 10/1995 | (EP) . |
| 2 370 771 | 6/1978 | (FR) . |
| 55065947 | 5/1980 | (JP) . |
| 61061667 | 8/1988 | (JP) . |
| 1193848 | 8/1989 | (JP) . |
| 3297684 | 12/1991 | (JP) . |
| 4125814 | 4/1992 | (JP) . |
| 5330259 | 12/1993 | (JP) . |
| 6024183 | 2/1994 | (JP) . |
| 6024184 | 2/1994 | (JP) . |
| 6024185 | 2/1994 | (JP) . |
| 6032085 | 2/1994 | (JP) . |
| 6123955 | 5/1994 | (JP) . |
| 6222535 | 8/1994 | (JP) . |
| 6305255 | 11/1994 | (JP) . |
| 7032772 | 2/1995 | (JP) . |
| 7032773 | 2/1995 | (JP) . |
| 7237363 | 9/1995 | (JP) . |
| WO 95/17437 | 6/1995 | (WO) . |
| WO 97/43319 | 11/1997 | (WO) . |

*Primary Examiner*—Susan W. Berman
(74) *Attorney, Agent, or Firm*—Merchant & Gould P.C.

(57) ABSTRACT

A cutable topcoat composition and apparatus useful for preparing stable data carrying devices, such as multi-layered laminates, and methods for preparing and using the composition. The composition includes a polymerizable composition and a polymeric binder. The polymerizable composition includes hard and flexible polymerizable subunits in a ratio that optimizes flexibility while retaining good adhesion and plasticizer resistance. In a preferred embodiment, a polymerization initiator is also included in the composition. Optionally, a chain transfer agent may also be added to the composition. The composition is substantially plasticizer free. The methods of using the composition include incorporating the composition into a topcoat film useful for storing the topcoat composition prior to use in preparing data-carrying devices, such as cards.

8 Claims, 5 Drawing Sheets

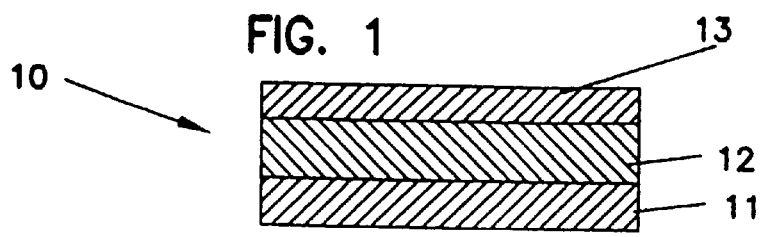
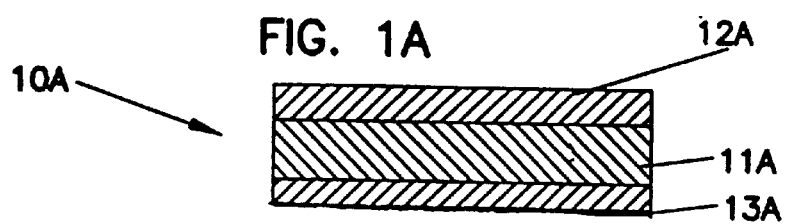
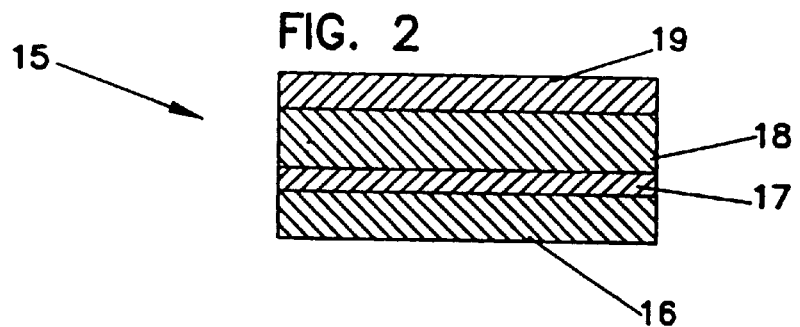
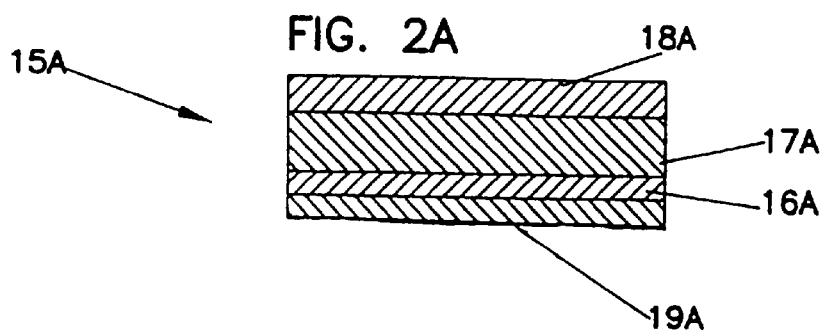

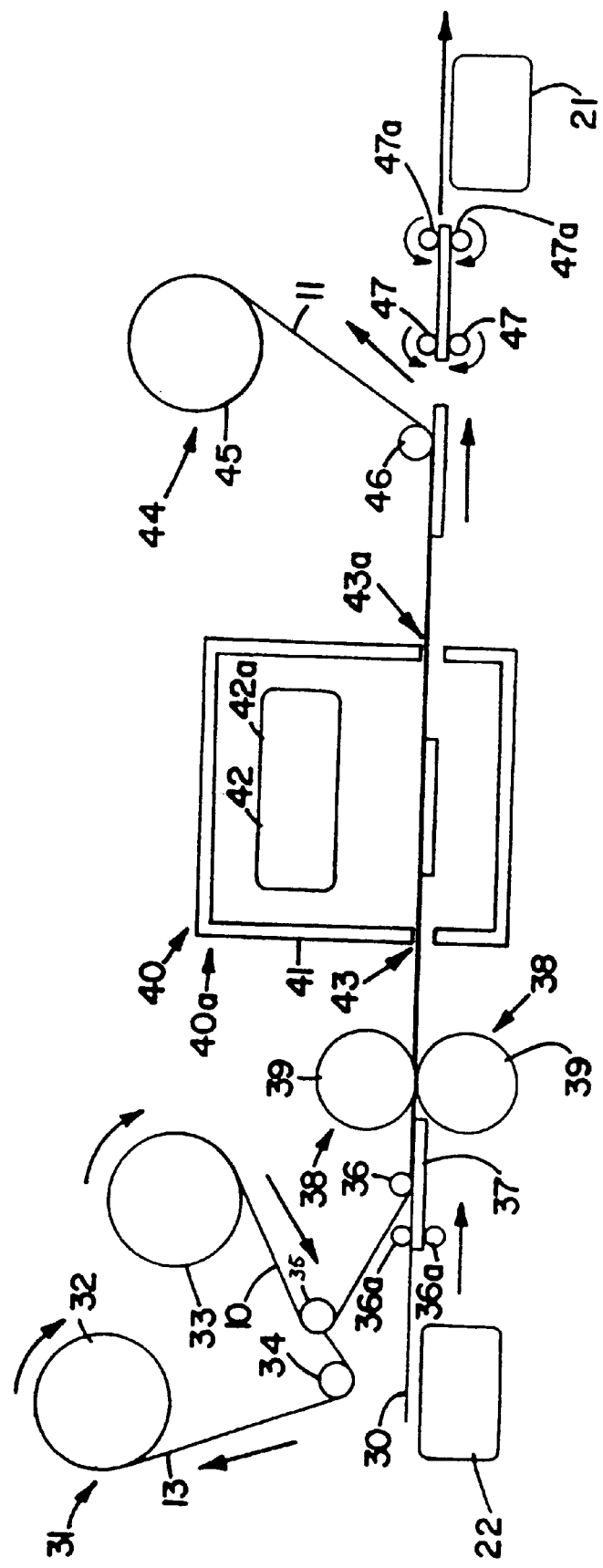

CURABLE TOPCOAT COMPOSITION AND METHODS FOR USE

This application is a Divisional of application Ser. No. 08/970,572, filed Nov. 14, 1997, now U.S. Pat. No. 6,001,893, which is a Continuation-In-Part of Ser. No. 08/649,105, filed May 17, 1996, now abandoned, which applications are incorporated herein by reference.

BACKGROUND OF THE INVENTION

The invention relates to curable topcoat compositions useable in multi-layered polymeric laminates, such as data carrying devices, and methods for using these compositions. The invention is also directed toward apparatus useful for preparing multi-layered polymeric laminates incorporating the topcoat compositions of the invention.

Polymeric multi-layered laminates, such as data carrying devices, are well-known and generally used for items such as identification cards, telephone calling cards, instant cash cards, credit cards, and company identification cards. Typically these types of laminates include a polymeric substrate (e.g., one or more polyester core layers) having multiple layers or films laminated thereon. Usually, the polymeric substrate is made from a rigid polymer sheet, and the multiple layers are made from flexible layers and/or films. In many of these types of processes, the films and/or layers are laminated into one multi-layered film and stored until the time that the multi-layered film is laminated to the polymeric substrate.

At least one of the films or layers in the multi-layered film can contain or can be a curable composition capable of enhancing a data carrying device's durability, strength and resistance to wear and tear. Typically, this composition is cured using, for example, ultraviolet radiation (i.e. UV). In general, the curable composition can be made from a composition containing a polymerizable monomer, a polymeric binder, a photoinitiator, and additives, such as colorants and plasticizers. Plasticizers generally facilitate processing and enhance the flexibility and toughness of the final product.

The curable composition, traditionally, is contained and laminated between two flexible sheets to form a multi-layered film. Flowability of the composition at room temperature while it is contained between sheets is important. If the composition has a relatively high flowability at room temperature or if the composition layer is too thick, then the composition tends to seep out from between the flexible sheets during storage. This seepage makes the multi-layered films more difficult to use, because the seepage can cause rolled films to stick together in spools, which creates difficulty in handling of the films prior to and during their use.

This problem is more fully discussed in U.S. Pat. No. 4,293,635, which issued on Oct. 6, 1981 to Flint et al. Flint et al. disclose a photopolymerizable composition that is used in photoresist elements and that has reduced flowability at room temperature. The Flint et al. composition has a relatively high polymer to monomer ratio (i.e. more than about 2:1 parts by weight), which helps to reduce the composition's flowability at room temperature. However, this high ratio can add materials and processing costs to the final product. In addition, the requirement for a relatively thick (i.e. 0.003 cm) layer of the composition to be included in the photoresist element can increase processing cost and time.

In some processes, a curable composition is applied directly to a surface of a printed polymeric substrate instead of being sandwiched between sheets in a multi-layered film.

One example of a process including the direct application of a UV curable composition to a substrate is disclosed in U.S. Pat. No. 5,302,438, which issued on Apr. 12, 1994 to Komamura et al. Komamura et al. disclose a method of preparing an image bearing recording member having a thermoplastic resin layer and radiation setting composition therein.

Another example of a process including the direct application of a UV curable composition to a substrate is disclosed in U.S. Pat. No. 5,254,525 which issued on Oct. 19, 1993 to Nakajima, et al. Nakajima et al. disclose an identification card that is coated with a UV setting resin and has a UV absorbing layer underneath the resin for image protection.

Direct application of the composition to the substrate requires more complex machinery than laminating a multi-layered film having the composition therein to the polymeric substrate. Thus, the Komamura et al. and Nakajima et al. processes seemingly require relatively complex equipment and skilled labor to prepare their image bearing recording member and identification card. These processes also require an operator to come into contact with chemicals that can be hazardous, which is not preferred for an office type of environment In many conventional processes, one of the flexible sheets included in the multi-layered film is removed exposing the curable composition layer prior to laminating the film to the substrate. The multi-layered film minus a flexible sheet is then laminated to the substrate with the exposed curable composition layer laminated directly to a surface of the polymeric substrate. The polymeric substrate configured as a data carrying device for example, can have print matter on one or more of its surfaces—including the surface laminated directly to the curable composition layer.

If the device is a card, the printed matter generally identifies the cardholder and/or the type of card. The printed matter can be applied using dye diffusion or thermal transfer printing methods known in the art. Once the printed matter is applied, it is important that the printed matter not smudge, deteriorate or crack during the useful life of the data carrying device. It has been discovered that plasticizers included in the curable composition layer, which is laminated directly to a printed surface of the polymeric substrate, can attack and degrade the printed matter on the polymeric substrate. This degradation reduces the useful life of the data carrying device. It has been discovered that thermal transfer printed and dye diffusion printed surfaces are especially susceptible to this attack and degradation.

It is desirable to prepare a stable and durable data carrying device that has improved physical properties, such as plasticizer or chemical resistance, adhesion, abrasion resistance and/or flexibility. It is also desirable that these devices be capable of being prepared by an unskilled end user in an office environment using office-size equipment. Furthermore, it is desirable that the equipment operator not have significant exposure to hazardous chemicals.

SUMMARY OF THE INVENTION

The invention is directed toward a curable topcoat composition useable to form a topcoat layer of a data carrying device. An example of a suitable data carrying device is a stable polymeric laminated data carrying device. As used herein, the term "stable" when referring to a multi-layered laminate, such as a data carrying device, refers to a laminate that passes the STABILITY test detailed-below.

The topcoat composition of the invention includes a polymerizable composition and polymeric binder. Preferred compositions of the invention include a polymerization initiator and a chain transfer agent. As used herein, the term "polymerizable composition" refers to a composition that effectively contains only polymerizable monomer and/or polymerizable oligomer.

As used herein, the term "polymerizable monomer" refers to any monomer useful in a laminate that polymerizes, preferably upon actuation of a polymerization initiator and formation of a free radical. As used herein, the term "polymerizable oligomer" refers to any oligomer useful in a laminate that polymerizes, preferably, upon activation of a polymerization initiator and formation of a free radical. The term "polymerizable subunit" refers to both polymerizable monomers and oligomers.

The polymerizable composition, typically, is present in the curable topcoat composition in an amount of at least about 10% by weight and not greater than about 70% by weight of the curable topcoat composition. The polymeric binder is typically present in the curable topcoat composition in an amount of at least about 10% by weight and not greater than about 70% by weight of the curable topcoat composition. Furthermore, the ratio by weight of the polymerizable composition to polymeric binder is, typically, between 0.75:1 and 1.50:1 inclusive. In most preferred embodiments of the invention, the ratio of polymerizable composition to polymeric binder is about 1:1.

Polymerization initiator is present in preferred embodiments in an amount of at least about 0.5% by weight and not greater than about 10% by weight of the curable topcoat composition. The polymerization initiator initiates polymerization once actuated by heat or radiation, for example. In more preferred embodiments, a photoinitiator is used as the polymerization initiator.

The composition of the invention is also substantially plasticizer free. As used herein, the term "substantially plasticizer free" when referencing a composition, refers to a composition to which no effective amount of plasticizer is added. The polymeric binder and polymerizable composition used in the invention, or mixtures thereof, are not considered to be plasticizers, as this term is used herein.

In most preferred embodiments of the invention the polymeric binder includes a methyl methacrylate polymer and a polyvinyl aceate polymer. Preferably, the polymerizable composition includes a combination hard and flexible polymerizable subunits to optimize stability, abrasion resistance and plasticizer resistance while retaining sufficient flexibility such that the coating does not crack during flexing or embossing. Preferably, the composition includes a combination of ethoxylated trimethylolpropane triacrylate (TEOTA) monomers having differing degrees of ethoxylation. Preferably, the polymerizable composition includes "hard" TEOTA monomer having a degree of ethoxylation between about 1 and about 10, more preferably between about 1 and about 5 and "flexible" TEOTA monomer having a degree of ethoxylation between about 10 and about 20, more preferably, about 10 and 15. The preferred ratio of "hard" polymerizable subunit to "flexible" polymerizable subunit will vary depending on the degree of ethoxylation of the subunits. One of skill in the art can easily determine a suitable ratio. By way of example, for a composition which includes "hard" TEOTA monomer having a degree of ethoxylation of 3 and "flexible" monomer having a degree of ethoxylation of 15, preferably, the ratio (by weight) of "hard" polymerizable subunit to "flexible" polymerizable subunit is from about 1:1 to 6:1, more preferably, 1.5:1 to 4:1, most preferably, 1.85:1 to 3.5:1. The most preferred polymerization initiator is a 1-hydroxycyclohexyl phenyl ketone (HCPK) photoinitiator commercially available as IGRACURE® 184 from Ciba-Geigy Corp. of Tarrytown, N.Y. The curable composition of the invention can also include a chain transfer agent, such as 2-mercapto benzoxazole.

The invention is also directed toward uses and methods of using the curable topcoat composition. One such use is in a curable topcoat film that is useable in preparing a data carrying device, such as a stable polymeric laminated card. Topcoat films of the invention are generally multi-layered and include a topcoat layer, which is formed from the curable topcoat composition of the invention, and a base film. In preferred embodiments, a cover film and, optionally a release layer can be included in the topcoat films of the invention. As used herein, the term "topcoat layer" refers to a layer that is made from a topcoat composition of the invention and that is included in a multi-layered film or in a data carrying device.

More preferred embodiments include a topcoat layer, and a base film having a release coat thereon. The release coat, if included in the topcoat film, is preferably put on a first surface of the base film, while the topcoat layer is put on a second surface of the base film. If a release coat is used, most preferably, it is a silicon containing release coat.

Applicants have found that use of a release coat on the base film allows the topcoat film to be self-wound, which typically eliminates the need for a cover film. As used herein, the term "self-wound" when directed toward a film, refers to a multi-layered film that typically does not require a cover film and that can be wound into and unwound out of a spool or reel without significant blocking or sticking.

If a cover film is included in the topcoat film, then preferably, the topcoat layer is sandwiched between the base film and the cover film. If the topcoat film includes a release layer, then preferably the release layer is sandwiched between the topcoat layer and the base film.

In most preferred embodiments, the base film includes polyethylene terephthalate, the cover film, if included, includes silicon coated polyethylene terephthalate, polyethylene or polypropylene, and the release layer, if included, includes a wax.

The topcoat layer included in the topcoat film is preferably at least about 2 $\mu$m thick and not greater than about 15 $\mu$m thick. Generally, this thickness facilitates a time efficient cure, product cost effectiveness, and prevention of topcoat layer seepage from between the films adjacent to the topcoat layer.

The data carrying devices of the invention exhibit improved physical properties, such as adhesion, plasticizer resistance, UV resistance, abrasion resistance, and/or overall durability when compared with devices that do not contain a topcoat composition of the invention. These devices include a polymeric substrate and a topcoat, layer formed from the topcoat composition of the invention. These data carrying devices, optionally, include a release layer, which can facilitate preparation of the device.

In order to include a release layer in data carrying devices of the invention, typically the release layer is included in the topcoat film, and the topcoat film is then applied to a polymeric substrate, as detailed below, to form a data carrying device. If a wax release layer is included in the topcoat film, it can be applied to the base film by mixing the wax with a solvent, putting this mixture on the base film, and evaporating the solvent from the mixture forming a release layer.

Preferred methods for preparing the topcoat film having a topcoat layer made from the curable topcoat composition therein include: providing the topcoat composition and applying it to a base film. The base film can have a release coat on one surface and the topcoat layer, formed from the topcoat composition, on the other surface. Applying the topcoat composition to the base film can include combining the topcoat composition with a solvent, putting this mixture on the base film, and evaporating the solvent from the base film.

The methods of making the topcoat film can also include the preparation and application of a release layer. Furthermore, if the topcoat film is not self-wound, methods for making the topcoat film can include laminating a cover film to the topcoat layer.

Once prepared, the topcoat film of the invention, regardless of whether it is self-wound or not, can be rolled into spools or reels for storage and ease in application to a polymeric substrate in preparation of a data carrying device of the invention.

Preferred methods for preparing stable data carrying devices include steps of: providing the topcoat film having the topcoat layer therein; providing a polymeric substrate useable in a data carrying device; laminating the topcoat film to the polymeric substrate in such a manner that the topcoat layer is adjacent to the polymeric substrate forming a topcoated polymeric substrate; curing the topcoated polymeric substrate, and removing the base film from the cured topcoated polymeric substrate. In alternative preferred embodiments, the base film can be removed prior to the curing process.

The polymeric substrate can have printed matter on one or more of its surfaces. In particular, if the matter is printed using a dye diffusion or thermal transfer printing process, then the topcoat composition included in the topcoat layer of the invention can increase the printed matter's durability and useful life, if the topcoat layer is laminated adjacent to the thermal transfer or dye diffusion printed matter. The invention is also directed toward methods of protecting dye diffusion and/or thermal transfer printed matter. As used herein, the term "dye diffusion printed matter" refers to any images printed using a dye diffusion printing technique or method known in the art. As used herein, the term "thermal transfer printed matter" refers to any images printed using a thermal transfer printing technique or process known in the art.

If a data carrying device is prepared using a topcoat film that includes a cover film, then preferably the cover film is removed from the topcoat film prior to the laminating and curing processes. If the topcoat film being applied to the polymeric substrate to form the data carrying device, is self-wound, then in methods of the invention the release coat and base film are removed from the topcoat film simultaneously during the base film removal process.

Most preferably, the topcoat layer included in the topcoat film is contacted to the substrate during data carrying device preparation using rolls, rollers and take up and/or supply spools or reels. In other words, in most preferred embodiments of the invention, the topcoat film is wound into spools or reels prior to use and unwound just prior to applying the topcoat film onto a polymeric substrate. The terms "rolls" and "rollers" are used interchangeably herein.

Methods of preparing data carrying devices of the invention include a curing process which preferably includes: transporting the polymeric substrate having the topcoat layer thereon into a curing unit, activating a pulsating curing means, and transporting the data carrying device from the curing unit. As used herein the term "curing means" refers to any energy source that emits energy useable to cure the topcoat layer of the invention. The term "pulsed", when directed to a curing means, refers to an energy source that during the curing process intermittently emits energy, as opposed to continuously emitting energy.

The most preferred type of energy is UV, and the most preferred curing means is a UV curing unit. Preferably, any curing unit that is used is secured during energy activation in such a way that a minimal amount of energy leaks from the curing unit into the ambient environment. In preferred embodiments, the polymeric substrate having the topcoat layer thereon is transported by rollers into and out of the curing unit. Applicants have found grit-coated rollers to be useful for this purpose.

Preferred methods of preparing data carrying devices of the invention include removing the base film from the topcoat film using a base film take up reel. If a cover film is included in the topcoat film, preferably, it is removed using a cover film take up reel.

In more preferred embodiments, the data carrying device of the invention is prepared by: providing a polymeric substrate useable in a data carrying device; providing a supply reel of topcoat film, which has a base film and topcoat layer therein; unwinding the topcoat film from the supply reel; laminating, the topcoat film to the substrate; removing the base film having the release coat thereon from the topcoat film and exposing the topcoat layer to form a topcoat laminated substrate; and curing the topcoat laminated substrate inside of a curing unit. Preferably, the polymeric substrate having the topcoat layer thereon is transported into and out of a curing unit with rollers that do not contact the topcoat layer, which is laminated onto the polymeric substrate. In alternative more preferred embodiments, the base film can be removed subsequent to the curing process. In other embodiments, the base film may not have a release coat thereon.

The invention is also directed toward an apparatus for preparing a data carrying device, such as a stable polymeric laminated data carrying device. The apparatus of the invention includes the following systems: topcoat film supply and application system for supplying topcoat film and applying the topcoat film to a polymeric substrate; laminating system for laminating the topcoat film to the polymeric substrate; base film removal system for removing a base film from the topcoat film; curing system for curing the topcoat film on the polymeric substrate; and a transport system for moving the polymeric substrate from system to system through the apparatus.

In preferred embodiments, the topcoat film supply and application system includes a topcoat film supply reel. Preferably, the laminating system includes laminating rolls, and the base film removal system includes a base film take up reel. If a cover film is included in the topcoat film used to prepare a data carrying device of the invention, then the apparatus, should include a cover film removal system, and preferably, this system includes a cover film take up reel.

In preferred embodiments, the curing system includes a curing unit that contains a pulsed energy curing means. Most preferably, the curing unit can be fully secured in such a manner that no light or actinic radiation, if UV is the energy source, escapes from the unit while the energy emitter is emitting radiation.

In preferred embodiments, the transport system includes rollers. Applicants have found that rubber rollers and/or grit-coated rollers are useful in the transportation process. Preferably, these rollers do not contact a surface of the polymeric substrate having a topcoat layer thereon.

The transport system can also include photocells or other means of detecting the location of the polymeric substrate as it is transported through the systems included in the apparatus of the invention.

The apparatus of the invention is designed to be used alone or in conjunction with a variety of other equipment that can be used to process data carrying devices, such as cards. The equipment of the invention can be used in a variety of environments ranging from office types of environments to full scale manufacturing environments. The apparatus of the invention can also be used for a variety of applications ranging from low volume to high volume types of applications.

BRIEF DESCRIPTION OF THE DRAWINGS

FIG. 1 illustrates a schematic cross-sectional view of a preferred topcoat film of the invention;

FIG. 1A illustrates a schematic cross-sectional view of a second preferred topcoat film of the invention;

FIG. 2 illustrates a schematic cross-sectional view of a third preferred topcoat film of the invention;

FIG. 2A illustrates a schematic cross-sectional view of a fourth preferred topcoat film of the invention;

FIG. 5 schematically illustrates a preferred process for preparing a data carrying device of the invention;

DETAILED DESCRIPTION OF PREFERRED EMBODIMENTS

Figure 3:
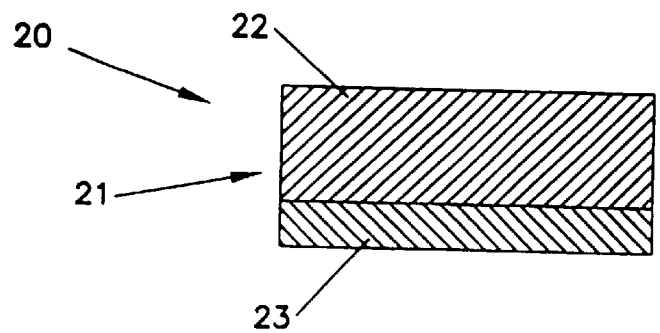
FIG. 3 illustrates a schematic cross-sectional view of a preferred data carrying device of the invention.

The invention is directed toward a curable topcoat composition useful in preparing stable data carrying devices, such as multi-layered laminated polymeric card. The composition of the invention has a relatively low flowability at room temperature so that seepage from between the layers of the topcoat film during storage generally does not occur. Moreover, since a relatively thin (i.e. no more than about 15 µm) layer of the composition is needed in the laminates of the invention, there is less tendency for the composition to seep from between film layers. The present invention decreases the tendency for seepage without requiring a relatively high ratio (i.e. greater than 1.5:1) of polymeric binder to polymerizable composition.

The compositions of the invention generally do not include a plasticizer. Applicants have found that plasticizers can seep through cracks in crystalline layers included in data carrying devices and facilitate dye migration. This dye migration usually shortens the useful life of a data carrying device having printed matter thereon. Thus, without plasticizers, the data carrying devices incorporating the topcoat composition typically have improved physical properties and a longer useful life tan data carrying devices having a plasticizer therein. Moreover, data carrying devices incorporating the composition of the invention can have dye diffusion and/or thermal transfer printed matter that is less likely to crack, fade or degrade with time when compared with data carrying devices having a plasticizer therein.

Data carrying devices of the invention are stable and, typically, have improved physical properties, such as overall durability, chemical resistance, adhesion, abrasion resistance and/or flexibility. Furthermore, as detailed below, data carrying devices having the topcoat layer of the invention therein can be prepared by unskilled laborers in an office environment using office-size equipment. Moreover, the laborers using the methods and, apparatus of the invention would not have to come in contact with significant amounts of hazardous monomers, oligomers and/or polymers included in the topcoat composition.

The composition of the invention contains a polymerizable composition and polymeric binder. A polymerization initiator and other constituents, such as a chain transfer agent, colorant or other additives can also be included in the composition. The composition is preferably applied to a particular film and then laminated between films to form a topcoat film in which the composition is stored until it is applied to a polymeric substrate to form a data carrying device.

The invention is also directed toward methods of protecting printed matter, such as thermal transfer and dye diffusion printed matter, using the topcoat composition and toward topcoat films and data carrying devices incorporating the topcoat composition and methods of making thereof. The methods of making the data carrying devices of the invention include use of an apparatus that is office-sized and capable of being operated by unskilled laborers.

Because the topcoat composition is incorporated into a topcoat film, and it is the topcoat film that is applied to a polymeric substrate useful in a data carrying device, a novel dry process, disclosed below, can be used to prepare data carrying devices of the invention. During this dry process, operators are typically not exposed to liquids or hazardous chemicals.

Furthermore, in most preferred embodiments, the curing portion of the dry process is conducted primarily within a closed curing unit that does not allow significant amounts of energy, such as radiation, to escape into the office environment. Thus, operators tend not to be exposed to significant amounts of radiation, for example, during data carrying device preparation.

Curable Topcoat Composition

The topcoat composition of the invention is generally a thermoplastic composition that forms a high molecular weight polymer when cured. The composition protects and extends the useful life of frequently handled multi-layered data carrying devices, such as cards. The curable topcoat composition can be made by combining a polymerizable composition, a polymeric binder, preferably a polymerization initiator and a chain transfer agent, and other constituents useful in a multi-layered laminate, such as a topcoat film or data carrying device.

Polymerizable Composition

The polymerizable composition is essentially a composition of at least one type of polymerizable subunit (i.e., monomer and/or oligomer). Any monomer and/or oligomer that polymerizes and/or crosslinks under controlled conditions and that is useful in laminate preparations is useful in the invention. Monomers and/or oligomers useful in the invention typically polymerize (i.e., cure) upon creation of a free radical in the composition. Preferably, the free radical is created by a polymerization initiator, which is activated by a source of heat or radiation, for example. As discussed more fully below, preferred compositions of the invention also include a polymerization initiator.

It is important to achieve a balance in the polymerizable composition between "hard"-polymerizable subunits which provide stability abrasion resistance and plasticized/chemical resistance and "flexible" polymerizable subunits which provide flexibility. An overabundance of hard polymerizable subunits results in a composition that is prone to cracking when embossed or flexed. On the other hand, a composition having too much flexible polymerizable subunit will not have as much stability, abrasion resistance and plasticize/chemical resistance. As used herein, the term "hard" is a relative term meaning the resulting polymer has a higher crosslinking density when compared to a "flexible" polymer. The term "crosslinking density" refers to the length of a polymer chain between two neighboring crosslinks. A preferred "hard" polymerizable subunit is ethoxylated trimethylolpropane triacrylate (TEOTA) having a degree of ethoxylation between about 1 to about 10, more preferably, between about 1 and about 5, most preferably, about 3. TEOTA having a degree of ethoxylation of 3 is commercially available from Sartomer Company of Exton, Pa. as SR454. Additionally, TEOTA having the desired degree of ethoxylation can be obtained by reacting trimethylolpropane (TMP) with ethylene oxide and then reacting the product with acrylic acid or a derivative thereof. This reaction is represented below. Details which would be apparent to one of skill in the art have been excluded for the sake of simplicity.

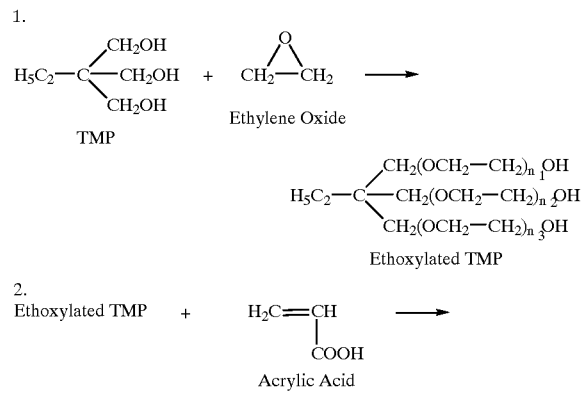

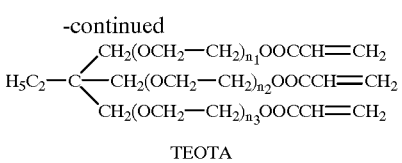

TEOTA

As used herein, "degree of ethoxylation" refers to the number of moles of ethylene oxide reacted with each mole of TMP during the formation of TEOTA (i.e., $n_1+n_2+n_3=$ degree of ethoxylation).

As used herein, the term "flexible" is a relative term meaning that the resulting polymer has a lower crosslinking density than a "hard" polymer. Generally, increasing the degree of alkoxylation of a monomer, such as TEOTA, increases flexibility of the final product. An example of a "flexible" polymerizable subunit is ethoxylated trimethylolpropane triacrylate (TEOTA) having a degree of ethoxylation from about 10 to about 20, more preferably, about 10 to about 15, most preferably, 15. TEOTA having a degree of ethoxylation of 15 is commercially available from Sartomer Company of Exton, Pa. as SR 9035, or can be manufactured as described above.

Other suitable polymerizable subunits include other alkoxylated triacrylate monomers, for example, those formed by reacting TMP with propylene oxide or butylene oxide. As with the ethoxylated triacrylate monomers discussed above, a preferred composition includes a combination of hard and flexible alkoylated monomers such that the resulting composition displays good stability, plasticizer resistance and abrasion resistance and good flexibility. As discussed above in connection with ethoxylation, hard and flexible are relative terms which refer to the degree of crosslinking. The degree of crosslinking for other alkoxylated triacrylate monomers can be varied in the same way that the degree of crosslinking for ethoxylated monomers can be varied.

The polymerizable composition may alternately include a combination of hard and flexible polyester or urethane acrylate polymerizable subunits.

Preferably, the hard and flexible polymerizable subunits are present in the polymerization composition at a ratio (by weight) which optimizes the flexibility of the coating while maintaining abrasion and plasticizer resistance. The ratio will vary depending on the degree of ethoxylation or alkoxylation of the polymerizable subunit. By way of example, a composition which includes hard TEOTA monomer having a degree of ethoxylation of 3 and flexible TEOTA monomer having a degree of ethoxylation of 15 preferably contains a ratio (by weight) of hard to flexible monomer of about 1:1 to 6:1, more preferably 1.5:1 to 4:1, most preferably 1.85:1 to 3.5:1.

The amount of monomer and/or oligomer (i.e. polymerizable composition) included in the topcoat composition can vary with the end use of the product. If too much polymerizable composition is used the topcoat composition can have a high flowability, which can cause seepage of the topcoat composition from the resulting topcoat film before application and curing. If too little polymerizable composition is used, then physical properties and performance, such as durability and useful life, can be sacrificed because there would be too much polymeric binder in the composition. Typically, the polymerizable composition is included in the composition in an amount of at least about 10% by weight and not greater than about 70% by weight of the topcoat composition. Preferably, the amount is at least about 30% and not greater than about 70% by weight of the topcoat composition.

Additionally, the polymerizable composition may include other monomers, such as those listed in European Patent 0 677 397 A1 at page 5, lines 54–58 and page 6, lines 1–23, in a minor amount (i.e., less than about 20% of the weight of the polymerizable composition) which does not adversely affect the abrasion resistance, chemical resistance, plasticizer resistance, stability or flexibility of the resulting topcoat layer.

Monomers listed in European Patent 0 677 397 A1 include: methyl acrylate, methyl methacrylate, ethyl acrylate, ethyl methacrylate, propyl acrylate, propyl methacrylate, butyl acrylate, butyl methacrylate, isobutyl acrylate, isobutyl methacrylate, tert-butyl acrylate, tert-butyl methacrylate, isodecyl acrylate, isodecyl methacrylate, lauryl acrylate, lauryl methacrylate, lauryltridecyl acrylate, lauryltridecyl methacrylate, tridecyl acrylate, tridecyl methacrylate, cerylstearyl acrylate, cerylstearyl methacrylate, stearyl acrylate, stearyl methacrylate, ethylhexyl acrylate, ethylhexyl methacrylate, octyl acrylate, octyl methacrylate, cyclohexyl acrylate, cyclohexyl methacrylate, benzyl acrylate, benzyl methacrylate, methacrylic acid, hydroxyethyl acrylate, hydroxyethyl methacrylate, hydroxypropyl acrylate, hydroxypropyl methacrylate, dimethylaminoethyl acrylate, dimethylaminoethyl methacrylate, diethylaminoethyl acrylate, diethylaminoethyl methacrylate, tert-butylaminoethyl acrylate, tert-butylaminoethyl methacrylate, glycidyl acrylate, glycidyl methacrylate, tetrahydrofurfuryl acrylate and tetrahydrofurfuryl methacrylate, and ethylene diacrylate, ethylene dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, decaethylene glycol diacrylate, decaethylene glycol dimethacrylate, pentadecaethylene glycol diacrylate, pentadecaethylene dimethacrylate, pentacontahectaethylene glycol diacrylate, pentacontahectaethylene glycol dimethacrylate, butylene diacrylate, butylene dimethacrylate, aryl acrylate, aryl methacrylate, trimethylolpropane triacrylate, trimethylolpropane trimethacrylate, hexanediol diacrylate, hexanediol dimethacrylate, tripropylene glycol diacrylate, tripropylene glycol dimethacrylate, pentaerythritol tetraacrylate, pentaerythritol tetramethacrylate, dipentaerythritol hexaacrylate, dipentaerythritol hexamethacrylate, 1,6-hexanediol diacrylate, 1,6-hexanediol dimethacrylate, neopentyl glycol pentaacrylate, neopentyl glycol pentamethacrylate, phosphazene hexaacrylate and phosphazene hexamethacrylate. The above-enumerated materials can be used not only as monomers but also as oligomers. Further, acrylic reactive polymers such as polyester acrylate, epoxy acrylate, urethane acrylate and polyether acrylate polymers which are polymers of the above-enumerated materials, or the derivatives thereof can also be used. These monomers, oligomers and acrylic reactive polymers can be used either singly or as a mixture thereof.

Polymeric Binder

The composition also includes a polymeric binder that acts as a carrier matrix and generally holds the polymerizable composition in place. The polymeric binder also facilitates separation of the topcoat layer from the base film and/or cover film at the appropriate time. The polymeric binder can also facilitate improved physical properties and/or performance of a data carrying device of the invention when compared with a device that does not have the polymeric binder therein.

Any polymeric binder useful in a lariate that does not interfere with or inhibit the polymerization of the monomer and/or oligomer in the polymerizable composition is useful in the invention. The polymeric binder must also maintain its structural integrity during lamination processing. Typically the polymeric binder also provides adhesion and durability to a data carrying device of the invention.

Polymeric binders useful in the composition of the invention include: methyl methacrylate polymer, polyvinyl acetate polymer, and binders disclosed in column 6 at lines 10–59 in U.S. Pat. No. 5,279,689, which issued on Jan. 18, 1994 to Shvartsman.

Methyl methacrylate polymer, polyvinyl acetate polymer, and mixtures thereof are most preferred. These polymeric binders are commercially available as ELVACITE 2051 from ICI Resins and as VINAC B-15 from Air Products Chemical Company.

The amount of polymeric binder that is included in the composition can vary with the end use of the product. If too little polymeric binder is included in the composition, then adhesion is compromised, and the composition tends to seep from between films. If too much polymeric binder is included in the composition, then physical properties and/or performance of the composition in a data carrying device can be decreased. Typically, the composition is at least about 10% by weight polymeric binder and not greater than about 70% by weight of the composition. Preferably, at least about 40% by weight of the composition is polymeric binder.

In general, Applicants have found that the ratio by weight of the polymerizable composition to the polymeric binder effects the durability and physical properties of the topcoat composition in such a manner that a particular ratio range is preferred. Generally, compositions of the invention have a polymeric binder ratio by weight of between 0.75:1 and 1.5:1 inclusive. Most preferably, the ratio of polymerizable composition to polymeric binder is about 1:1.

Polymerization Initiator

A polymerization initiator that is activated under controlled conditions and that is inactive prior to activation is also preferably included in the composition. The initiator initiates polymerization and/or crosslinking of the monomer and/or oligomer included in the polymerizable composition. The initiator preferably is not active prior to activation, and it must maintain its stability and ability to initiate polymerization during the topcoat film preparation process and data carrying device preparation process up until the polymeric substrate having the topcoat layer thereon is to be cured. Polymerization initiators useful in the invention are typically activated by actinic radiation. However, initiators included in the topcoat composition can be actuated by other sources, such as heat or visible light. The polymerization initiator typically gets activated by an activation energy source (e.g., ultraviolet radiation) and generates a free radical. This free radical then reacts to polymerize and, thus, cure the composition. Initiators useful in the invention include polynuclear quinones, which are compounds having two intracyclic carbon atoms in a conjugated carbocyclic ring system. Initiators useful in the invention include those disclosed in U.S. Pat. No. 5,279,689 to Shvartsman at columns 5 and 6. In addition, derivatives and combinations of the following can be useful initiators: HCPK, alpha-amino acetophenone, benzophenone, 2,2-dimethoxy-2-phenyl acetophenone, 2-methyl-1-[4-(methyl-thio)phenyl]-2-morpholino propan-1-one (MMMP), and 2-hydroxy- 2-methyl-1-phenyl-proan-1-one (HMPP). HCPK is most preferred, and it is commercially available as IGRACURE® 184 from Ciba-Geigy Corp.

The amount of polymerization initiator to be added to the composition varies with the type of initiator used and the amount of monomer and/or oligomer to be polymerized. If there is too little initiator included in the composition, then not enough of the monomer and/or oligomer could cure, and there could be reduced physical properties and/or useful life. Adding initiator in excess is cost inefficient. Moreover, if too much initiator is added to the composition, it could precipitate out of the solution. Typically, at least about 0.5% by weight and not greater than about 10% by weight of the composition is initiator.

Other Constituents

Other constituents useful in a curable layer of a laminate can also be included in the topcoat composition. These types of constituent include colorants, thickeners dyes, pigments, adhesion promoters, wetting agents, dispersing agents, defoamers, slip additives, adhesion resistant additives, fillers, leveling agents, antioxidants, optical brighteners, UV stabilizers, thermal stabilizers and chain transfer agents. Other constituents used in the composition must be able to maintain their structural stability and effectiveness throughout and subsequent to lamination and cure processing of data carrying devices of the invention.

Preferably, a chain transfer agent is included in the composition. Examples of chain transfer agents useful in the composition include: those hydrogen donor compounds listed in column 7 at lines 17–24 of U.S. Pat. No. 5,279,689 to Shvartsman. Most preferably, 2-mercapto benzoxazole is used. Typically, a chain transfer agent is added in an amount of at least about 0.01% by weight and not greater than about 4% by weight A solvent can be added to the composition in order to facilitate applying the composition to a layer or film. In other words, the previously described ingredients can be combined in a solvent, and applied to a flexible sheet, such as the base film in a topcoat film. Subsequent to this application, the solvent can be evaporated from the composition to form the topcoat layer in the topcoat film.

Unless otherwise noted, the amounts of each ingredient included in the composition are percentages by dry weight (i.e. without solvent) of the composition. Therefore, these are the percentages by weight of each ingredient in the composition either before any solvent is added to or after any solvent is evaporated from the composition.

Any solvent in which the polymerizable composition, polymeric binder, initiator, and any other constituents dissolve or remain in solution is useful in the invention. Preferably, the solvent is organic. However, the solvent should not dissolve the layer or film to which the curable topcoat composition is applied, as described more fully below.

Useful types of solvents include: amides, ethers, ketones, chlorohydrocarbons, esters, nitriles and mixtures thereof. Examples of these types of solvents are: methyl ethyl ketone, acetone, dimethyl formamide, methylene chloride, ethyl acetate, tetrahydrofuran acetonitrile, nitromethane, nitroethane and mixtures thereof. Methyl ethyl ketone is most preferred.

The amount of solvent needed varies with the means used to apply the curable topcoat composition to the film or layer and the desired dilution. The amount of solvent needed also varies with the type of monomer or polymeric binder being dissolved or remaining in solution. Typically, not more than about 70 parts per hundred of the composition is solvent. As detailed below, if solvent is added to the composition, it is evaporated prior to laminating the topcoat composition into a topcoat film. A typical topcoat composition having solvent therein is as follows: 44.75 parts per hundred polymer (e.g., 15% solid solution ELVACITE 2051 and 20% solid solution VINAC B-15), 7.35 parts per hundred monomer, 0.41 parts per hundred initiator, 0.04 parts per hundred chain transfer agent, and 47.45 parts per hundred solvent with the total solids in the formulation being 15%.

The curable topcoat composition can be incorporated into multi-layered polymeric laminates in order to increase overall durability and useful life of the laminate (e.g., a topcoat film and a data carrying device).

Multi-Layered Laminates

In accordance with the invention, the topcoat composition can be laminated between films or layers to form a topcoat film. This topcoat film can then be stored until such time as it is laminated to a polymeric substrate to form a data carrying device, such as a card.

Curable Topcoat Film

A curable topcoat film of the invention includes a base film and a topcoat layer. In addition, a topcoat film of the invention can include a release coat, a release layer and/or a cover film. For most applications, if a release coat is used, it is applied to a surface of the base film. Furthermore, for the applications in which a release layer is used, the release layer is typically located between the topcoat layer and the base film in the topcoat film of the invention. The release layer facilitates removal of the base film from the topcoat layer during data carrying device preparation.

In general, a cover film is used in applications not utilizing a release coat. Both the cover film and the release coat, facilitate prevention of sticking or blocking between the topcoat films, when they are stored on top of one another prior to use and/or further processing.

The curable topcoat film of the invention is a multi-layered laminate useful in protecting and carrying the topcoat composition, in the form of a topcoat layer, prior to its lamination to a polymeric substrate in accordance with the invention.

Topcoat Layer

The topcoat layer is made from the curable topcoat composition. This layer provides protection for printed matter on a polymeric substrate to be incorporated into a data carrying device, such as a card. This topcoat layer can increase the card's stability, durability, adhesion, flexibility, performance under compression and extension, chemical resistance, and abrasion resistance.

The thickness of the topcoat layer can vary with the application in which the topcoat film will be used. If the topcoat layer is too thick, then the composition can seep out from between the films or layers to which the topcoat layer is laminated. If the topcoat layer is too thin, it cannot provide improved physical properties to the polymeric substrate to which it is laminated. Typically, the topcoat layer is at least about 2 $\mu$m thick and not greater than about 15 $\mu$m thick. Preferably, the topcoat layer is at least about 4 $\mu$m thick and not greater than about 10 $\mu$m thick. Most preferably, the topcoat layer is about 6 to 7 $\mu$m thick. These thicknesses are measured subsequent to evaporation of any solvent from the topcoat layer and subsequent to curing of the topcoat composition.

Base Film

The base film functions as a carrier for the topcoat layer and as a protective layer to the topcoat layer, while the topcoat film is stored, for example, prior to data carrying device preparation. The base film can be made from any material that does not interfere or inhibit curing of the topcoat layer and that readily separates from the topcoat layer during data carrying device processing. The base film should also maintain its structural integrity and physical properties during lamination and cure and under storage conditions. The base film should also be smooth so that a pattern is not imparted to the topcoat layer, which is usually applied thereto.

The base film is generally a flexible sheet of polymers, such as a polyvinyl chloride or polyester. Preferably, polyethylene terephthalate is used in the base film because it is generally dimensionally stable.

The base film thickness can vary with the handling conditions or capabilities of the topcoat film storage and processing equipment Typically, the base film is at least about 6 µm and not greater than about 50 µm thick. Preferably, the base film is at least about 10 µm and not greater than about 20 µm thick. This preferred thickness usually provides optimal heat transfer, topcoat layer protection, and relatively easy processing in the apparatus of the invention described below. Most preferably, the base film is about 12.7 µm thick.

Release Coat

A release coat is useable in the topcoat films of the invention. A release coat facilitates separation of the topcoat layer from the base film when the topcoat film is rolled into a reel for storage and later for application to a polymeric substrate. In most preferred embodiments, a base film having a release coat thereon is included in the topcoat film. A topcoat film of the invention can be prepared by applying the topcoat composition to the base film sure not having the release coat thereon.

Any type of release coat that is useable in a multi-layered laminate, that is more easily separated from the topcoat layer than from the base film layer at room temperature, and that is capable of maintaining its integrity and stability during lamination processing is useful in the invention. Typically, these types of materials include: polydimethylsiloxanes, acrylate functional silicones, epoxy functional silicones, and polycaprolactones. Preferably, a silicon based release coat is used. This type of release coat can be obtained already applied to a base film useful in the topcoat films of the invention as silicone-coated one-side 48 gauge polyester film from Rexam Release Company of Oak Brook, Ill.

Cover Film

A cover film can be used to prevent the topcoat films from sticking together in the reels and to protect the topcoat layer prior to lamination of the topcoat film to a polymeric substrate. In one embodiment the topcoat film is a topcoat layer sandwiched between a cover film and a base film.

Any cover film should be made from a flexible polymer that easily releases from the topcoat layer at room temperature. The cover film is typically smooth. The cover film typically does not have to be capable of maintaining its integrity during the cure or lamination processes, because in preferred processes, it is stripped from the topcoat layer prior to lamination of the topcoat film to a polymeric substrate.

Cost effective polymers capable of being used to prepare a cover film include polyethylene, polypropylene or silicon coated polyethylene terephthalate. The cover film is typically about the same thickness as the base film. The cover film is at least about 6 µm thick and not greater than about 50 µm thick. Preferably, the cover film is at least about 10 µm thick and not greater than about 20 µm thick. Most preferably, the cover film is about 18.75 µm thick.

Release Layer

In one embodiment, topcoat films of the invention have a release layer sandwiched between the topcoat layer and the base film. The release layer can protect the topcoat layer before the cure process, when the base film and any cover film are stripped away prior to the curing stage. The release layer also facilitates separation of the uncured topcoat layer from the base film prior to curing. The topcoat layer, prior to curing, is somewhat tacky and generally, without the release layer, can sometimes be difficult to separate from the base film in many applications.

The release layer should be made from a material that is useable in a multi-layered laminate and that can be easily separated from the base film prior to curing the topcoat layer. The release layer should also be able to maintain its integrity and physical characteristics during the curing process and any storage time.

Materials most useful in a release layer include waxes or polycaprolactones. For example, natural and synthetic waxes, polyethylene, polyolefin blends, and mixtures thereof are useful in the release layer. Preferably, the release layer includes part saponified ester wax or montan wax. Most preferably, the release layer is HOECHST WAX OP commercially available from Hoechst Celanese Corporation (Charlotte, N.C.).

The release layer preferably is as thin as possible in order to minimize material costs and to maintain a clean release from the base film. Typically, a release layer included in the topcoat film is about 0.5 µm thick.

As discussed with respect to the topcoat composition, in order to form a release layer, the wax, for example, can be dissolved in an organic solvent for easier application to the base film. The solvent is then evaporated subsequent to application of the release composition to the base film. This procedure is discussed more fully below.

Preferred Processes for Preparing Topcoat Films

In general, there are four preferred processes for preparing topcoat films incorporating the topcoat composition of the invention. These processes correspond to the preparation of the four preferred topcoat film structures illustrated in FIGS. 1, 1A, 2, and 2A.

FIG. 1 shows a cross section of topcoat film 10 having a base film 11, a topcoat layer 12, and a cover film 13. In one process of the invention, a topcoat composition containing polymerizable composition, polymeric binder, a polymerization initiator, a chain transfer agent and organic solvent is prepared. These components, as previously discussed, are combined to form the topcoat composition. This composition is then applied to base film 11 using a machine coating technique known in the art. For example, the composition can be applied by gravure, rod metering, reverse roll or slot die techniques.

Once the topcoat composition is applied to base film 11, the solvent is evaporated from the composition forming topcoat layer 12. Cover film 13, preferably, is then laminated to the exposed surface of topcoat layer 12 forming topcoat film 10. Cover film 13 protects topcoat layer 12 during storage and prevents topcoat layer 12 from sticking to base film 11 when topcoat film 10 is rolled into spools, for example, for relatively easy and convenient storage.

In a second preferred process, topcoat film 10A is formed. The topcoat composition, detailed above, is applied to base film 11A using a machine coating technique known in the art, such as the techniques previously mentioned.

Once the topcoat composition is applied to a first surface of base film 11A, the solvent is evaporated from the composition forming topcoat layer 12A. Release coat 13A is applied to a second surface of base film 11A. Typically, base film 11A is purchased with release coat 13A thereon.

Applicants have found that use of a release coat in the topcoat film can eliminate the need for a cover film and allow the topcoat film to be self-wound. This embodiment of the topcoat film of the invention would be self-wound because the release coat would separate the topcoat layer from the base film, when the topcoat film was wound upon itself in a reel or spool. This embodiment of the topcoat film of the invention is typically the easiest to prepare and is usually the most cost efficient Furthermore, because of the reduced number of films included in this embodiment of the invention, more of this topcoat film can be put on a reel, when compared with those topcoat films having a cover film therein. A cover film can also be used to prevent blocking of the topcoat film while it is wound up in reels; however, the cover film usually takes up more space in the reel, than the release coat does. In addition, the release coat can be removed from the topcoat film when the base film is removed, so additional equipment is not needed to remove the release coat from the topcoat film during processing. Whereas additional equipment is usually needed, as discussed below, to remove a cover film during topcoat film processing.

In a third preferred process for preparing a topcoat film, topcoat film 15 is prepared. As illustrated in FIG. 2, topcoat film 15 includes base film 16 (which is essentially the same as base film 1), release layer 17, topcoat layer 18 (which is essentially the same as topcoat layer 12), and cover film 19 (which is essentially the same as cover film 13). The topcoat composition is prepared as discussed above with respect to the first preferred process.

In accordance with this preferred process, a release composition is also prepared by combining a wax, such as HOECHST WAX OP, for example, with an organic solvent, such as toluene. In a most preferred embodiment, Hoechst Wax OP in an amount of 3 parts per hundred is combined with toluene in an amount of 97 parts per hundred to form a release composition. The wax typically is first melted, and the solvent is heated prior to combining the wax with the solvent Once heated, the wax and solvent are combined, and the mixture is cooled while being vigorously stirred at room temperature.

This release composition is then applied to base film 16, using one of the previously discussed application techniques known in the art. The solvent is then evaporated from the release composition to form release layer 17. The solvent usually can be evaporated using heat (e.g., from a forced-air oven dryer), at a temperature of about 80° C. Base film 16 having release layer 17 thereon is then coated with the topcoat composition that is prepared as discussed previously. The organic solvent in the topcoat composition is evaporated forming topcoat layer 18.

It is important to note, that the solvents used in the topcoat composition and release composition should be carefully selected because the topcoat composition should not dissolve or diminish the integrity of release layer 17, when the topcoat composition is applied to base film 16 having release layer 17A thereon. In other words, the topcoat composition is applied to release layer 17. If the solvent in the topcoat composition is one in which the wax, for example, of release layer 17 dissolves, then release layer 17 could undesirably dissolve upon application of the topcoat composition. Use of methyl ethyl ketone, for example, as the topcoat composition solvent and toluene, for example, as the release layer composition solvent usually avoids this problem. Topcoat layer 18 and release layer 17 have now been applied to base film 16.

Finally, preferably, cover film 19 is laminated, as discussed previously, to base film 16, which has topcoat layer 18 and release layer 17A thereon, to form topcoat film 15.

In a fourth preferred process, topcoat film 15A is formed as illustrated in FIG. 2A. Topcoat film 15A includes base film 16A (which is essentially the same as base film 11A), release layer 17A, topcoat layer 18A (which is essentially the same as topcoat layer 12A), and release coat 19A (which is essentially the same as release coat 13A). The topcoat composition is prepared as discussed above with respect to the first preferred process.

In accordance with this preferred process, a release composition is also prepared as detailed in the discussion concerning the third preferred process. This release composition is then applied to base film 16A, using one of the previously discussed application techniques known in the art. The solvent is then evaporated from the release composition to form release layer 17A. The solvent usually can be evaporated using heat (e.g., from a forced-air oven dryer), at a temperature of about 80° C. Base film 16A having release layer 17 thereon is then coated with the topcoat composition that is prepared as discussed previously. The organic solvent in the topcoat composition is evaporated forming topcoat layer 18A.

It is important to note, that the solvents used in the topcoat composition and release composition should be carefully selected because the topcoat composition should not dissolve or diminish the integrity of release layer 17A, when the topcoat composition is applied to base film 16A having release layer 17A thereon. In other words, the topcoat composition is applied to release layer 17A. If the solvent in the topcoat composition is one in which the wax, for example, of release layer 17A dissolves, then release layer 17A could undesirably dissolve upon application of the topcoat composition. Use of methyl ethyl ketone, for example, as the topcoat composition solvent and toluene, for example, as the release layer composition solvent usually avoids this problem. Topcoat layer 18A and release layer 17A have now been applied to base film 16A.

As illustrated in FIG. 2A, base film 16A also has release coat 19A (which is analogous to release coat 13A) thereon As discussed previously, base film 16A is commercially available with release coat 19A thereon.

Topcoat films of the invention can be used to prepare data carrying devices of the invention, such as cards.

Data Carrying Device

The data carrying devices incorporating the topcoat composition of the invention generally include a polymeric substrate and a topcoat layer, and optionally a release layer. Cross-sections of the data carrying devices prepared using topcoat films illustrated in FIGS. 1, 1A, 2, and 2A are illustrated in FIGS. 3, 3A, 4, and 4A respectively.

Turning to FIG. 3, data carrying device 20 is a card 21 having a polymeric substrate 22 and topcoat layer 23. Polymeric substrate 22 functions as the primary structural component of card 21. Polymeric substrate 22 is usually made from a hard, rigid polymer and typically serves as the substrate onto which inks providing color and identifying information are applied.

Polymeric substrate 22 can include any type of polymer that provides structural integrity and stability to card 21.

This structural integrity must be maintained during and subsequent to the laminating and curing processes. Polymeric substrate 22 should also be capable of retaining inks and other identifying information and of being laminated to topcoat layer 23. Generally polymers such as polyvinyl chloride (PVC), acrylonitrile butadiene styrene terpolymer (ABS), polyesters, polycarbonates, and co-polymers thereof are useable in polymeric substrate 22. Most preferably, PVC or a polyester, such as polyethylene terephthalate, or mixtures thereof are included in polymeric substrate 22.

Polymeric substrate 22 can and preferably does have printed matter thereon. The matter is printed using techniques known in the air such as dye diffusion printing or thermal transfer printing. Topcoat layer 23 is made from the topcoat composition of the invention and is applied to polymeric substrate 22 as described below.

Figure 3A:
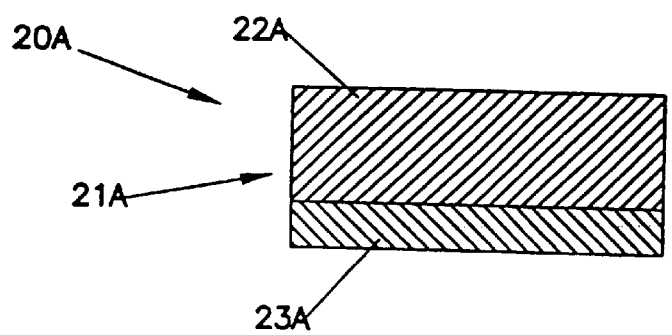
FIG. 3A illustrates a schematic cross-sectional view of a second preferred data carrying device of the invention.

Data carrying device 20A, which is shown in FIG. 3A, as a card 21A, has essentially the same structure as card 21. Card 21A has a topcoat layer 23A and a polymeric substrate 22A. This figure illustrates that topcoat films 10 and 10A can be used to prepare data carrying devices 20 and 20A, which have the same structure. As is evident from these Figures, base film 11 and 11A, cover film 13, and release coat 13A are removed from topcoat films 10 and 10A drawing data carrying device preparation in accordance with processes of the invention.

Figure 4:
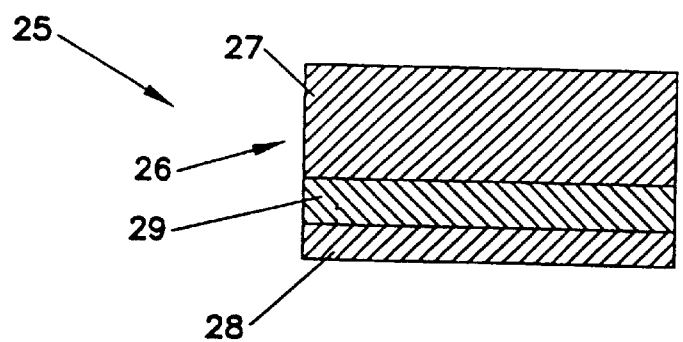
FIG. 4 illustrates a schematic cross-sectional view of a third preferred data carrying device of the invention.

Referring to FIG. 4, data carrying device 25 is a card 26 having a polymeric substrate 27, a release layer 28, and a topcoat layer 29. Polymeric substrate 27 is analogous to polymeric substrate 22, and topcoat layer 29 is analogous to topcoat layer 23. Polymeric substrate 27 preferably has dye diffusion printed or thermal transfer printed matter thereon. As described below, release layer 28 protects topcoat layer 29 before and during the curing process.

Figure 4A:
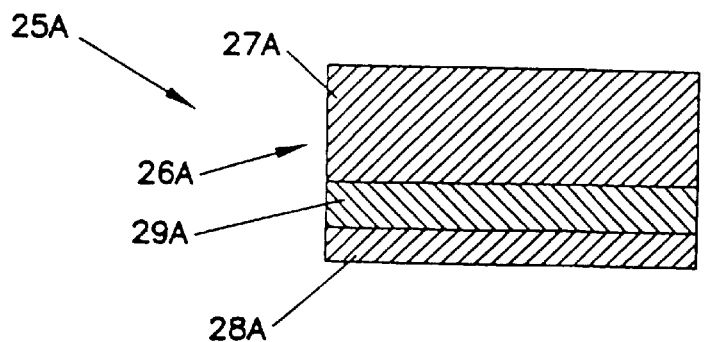
FIG. 4A illustrates a schematic cross-sectional view of a fourth preferred data carrying device of the invention.

Data carrying device 25A, which is shown in FIG. 4A, as a card 26A, has essentially the same structure as card 26. Card 26A has a topcoat layer 29A and a polymeric substrate 27A. This figure illustrates that topcoat films 15 and 15A can be used to prepare data carrying devices 25 and 25A, which have the same structure. As is evident from the Figures, base film 16 and 16A, cover film 19, and release coat 19A are removed from topcoat films 15 and 15A during data carrying device preparation in accordance with the invention.

In general, the apparatus and methods of the invention are designed to be used alone or in conjunction with a variety of other equipment and/or methods that can be used to process data carrying devices, such as cards. The equipment and methods of the invention can be used in a variety of environments ranging from office types of environments to full scale manufacturing environments. The apparatus and methods of the invention can also be used for a variety of applications ranging from low volume to high volume types of applications. For example, the methods and equipment of the invention can be included in a comprehensive identification card personalization system to create various personalized identification cards.

Methods of Preparing Data Carrying Devices

In general there are two preferred types of methods disclosed herein for preparing data carrying devices. In each method the topcoat film is laminated to a polymeric substrate and the topcoat layer included in the topcoat film is cured on the polymeric substrate. The first type of method is termed a "cure then strip" method, and the second is termed "a strip then cure method." In a cure then strip method, the base film included in the topcoat film of the invention is removed from the topcoat film after the topcoat layer included in the topcoat film has been cured. In the strip then cure method, the base film of the topcoat film is removed to the topcoat layer being cured.

Although both of these types of processes are preferred, Applicants have discovered several advantages in using the strip then cure method of preparing a data carrying device of the invention. These advantages are presented here and are evident from the detailed processing description discussed below.

A release layer tends not to be needed in the topcoat film when the base film is removed from the topcoat layer prior to curing the topcoat layer on the polymeric substrate. This is probably because the base film is more easily removed from the topcoat layer prior to the topcoat layer being cured.

As discussed in more detail below, the curing process can be conducted in a completely closed and secure unit, if the strip then cure process is utilized, because no permanent opening is required in the curing unit for the topcoat film to pass through the curing unit while transporting the polymeric substrate to the base film removal system. Because, in the strip then cure process, the topcoat film is not stretched along most of the length of the processing apparatus, there is less topcoat film waste, when equipment malfunctions than in the cure then strip process.

In addition, because the topcoat film is not retched along most of the length of the apparatus, the processing speeds of the lamination and curing processes are not dependent. Therefore, these separate processes can each be optimized for best performance. Typically, the lamination, curing and card transport systems all operate at different substrate velocity, which is only possible with relatively great difficulty when using the cure strip process. Independent lamination and curing processes also enable a quicker recovery when equipment malfunctions, because the machine can reach processing capacity faster than when the processing speeds are more dependent upon each other.

All of the preferred processes of preparing the data carrying devices of the invention include providing a topcoat film having a topcoat layer therein, providing a polymeric substrate laminating the topcoat film to the polymeric substrate, curing the polymeric substrate having the topcoated layer thereon, and removing the base film, regardless of whether it has release coat thereon, from the topcoat film. If the base film has release coat thereon, then the release coat is also removed with the base film. Furthermore, if a cover film is included in the topcoat film, then usually it is removed from the topcoat film prior to curing the polymeric substrate having the topcoat layer thereon. In more preferred embodiments, any cover film is also removed prior to removal of the base film, in order to expose the surface of the topcoat layer to be laminated to the polymeric substrate, as detailed below.

In a first preferred method of preparing data carrying devices, as illustrated in FIG. 5, polymeric substrate 22 is placed on transporting mechanism 30, and cover film removal and topcoat film application system 31 removes cover film 13 from topcoat film 10.

Cover film removal and topcoat film application system 31 includes cover film take up spool 32, topcoat film supply spool 33, cover film removal roller 34, cover film separation roller 35, and topcoat film application roller 36. Once polymeric substrate 22 is placed on transporting mechanism 30, polymeric substrate 22 is transported to transport rollers 36a. In most preferred embodiments, transport rollers 36a are rubber rollers. In addition, the gap between transport rollers 36a is preferably adjustable to allow various sizes of polymeric substrates to be processed.

In accord with the methods of the present invention, if a release coat is included on the base film in the topcoat film, then the topcoat film is self-wound, and a cover film removal system is not needed. Therefore, for preparation of a data carrying device using a self-wound film, such as topcoat film 10A, cover film take up spool 32, and cover film removal roller 34 would not be needed in the process. This is discussed more fully below in conjunction with the description of the process disclosed in FIG. 7.

Transporting mechanism 30 can be any transporting mechanism that can move a data carrying device, such as a card, through the cover film removal and topcoat film application system 31 and through the other systems included in data carrying device preparation that are discussed below. Transport rollers are most preferred for transporting polymeric substrates through the data carrying device preparation processes of the invention, because rollers can be arranged such that they only contact the edges of a data carrying device, such as a card. In other words, a polymeric substrate can be transported through processes of the invention without the transporting mechanism making contact with its faces, which is typically where inks and topcoat layers, for example, are located, and can be smudged or can adhere to the transport mechanism. In the preferred processes disclosed in FIGS. 5–7, rolls and rollers contacting the faces of polymeric substrates prior to the lamination processes are shown. Applicants have found that this contact by rollers with the polymeric substrates has little effect on the quality or physical properties of the data carrying device.

As shown in FIG. 5, in addition to rollers, the topcoat film 10, itself, can be a transporting mechanism 30. As discussed more fully below, polymeric substrate 22 is transported through transport rollers 36 a and then laminated to topcoat film 10, after its cover film 13 has been removed. Topcoat film 10, without cover film 13, then transports polymeric substrate 22 having topcoat film 10 thereon through the lamination process, curing process and base film removal process, which is where transport rollers again become a transporting mechanism.

Once prepared, topcoat film 10 is rolled into topcoat film supply spool 33. Once topcoat film 10 is to be used in a data carrying device, the end of topcoat film 10 is threaded through cover film removal and topcoat film application system 31. Cover film 13 is separated from topcoat film 10, and wrapped around cover film separation roller 34 and into cover film take up spool 32.

It is noted that cover film removal and topcoat application system 31 is arranged in such a manner that no rollers come in contact with topcoat layer 12, once cover film 13 is separated from topcoat film 10 and topcoat layer 12 is exposed.

Cover film removal and topcoat film application system 31 operates continuously. Thus, cover film 13 is continuously removed from topcoat film 10, while topcoat film 10, without cover film 13, is applied to polymeric substrate 22. Coated polymeric substrate, 37, having topcoat film 10, without cover film 13 thereon, is then transferred on transporting mechanism 30 (which is now topcoat film 10 without cover film 13) by topcoat film application roller 36 and to laminating rolls 38. Laminating rolls 38 laminate topcoat film 10, without cover film 13, to coated polymeric substrate 37.

Laminating rolls 38 can be any type of laminating rolls known in the art as useful for laminating data carrying devices. Preferably, laminating rolls 38 are rolls 39 brought together in close proximity to form a pinching nip (hereinafter referred to as nip rollers) and are operated at a temperature of at least about 50° C. and not greater tan about 150° C. More preferably, nip rollers 39 are operated at a temperature of about 118° C. Typically, nip rollers 39 apply a load of about 100 pounds to coated polymeric substrate 37. Nip rollers useful in the invention are available from Datacard Corp. in the clear overlay module of the 9000 series card personalization system. The pressure under which lamination occurs is typically enough to effectively laminate the topcoat film 10 to polymeric substrate 37, but is not so much that polymeric substrate 37 is distorted.

Transporting mechanism 30, then transports coated polymeric substrate 37 to curing unit 40. It is understood that transporting mechanism 30 can be operated at any rate necessary to completely laminate and cure topcoat film 10. Curing unit 40 is a UV curing unit 40a, and it includes curing unit walls 41, and energy source 42, which in a preferred embodiment is a UV source 42a, curing unit entrance 43, and curing unit exit 43a.

While in UV curing unit 40a, coated polymeric substrate 37 gets exposed to at least about 250 mj/cm$^2$ and not greater than 2000 mj/cm$^2$ of energy.

Curing unit 40, can be any type of curing unit that is useable in a lamination process. Preferably, curing unit 40 is relatively easy to use and is office-size so this process can be performed in an office environment by unskilled laborers. A pulsed UV light curing unit useful in the invention is commercially available from Xenon of Boston, Mass. Also useful are standard mercury vapor UV lamps available from Hanovia of Newark, N.J. or from Fusion Systems of Rockville, Md.

Most preferably, curing unit 40 is a pulsed energy curing unit. Pulsed energy emitting curing units generally are easier to keep cool in an office environment than continuous energy emitting curing units. Consequently, pulsed energy curing units tend to have a longer useful life and tend to allow less energy to escape from the unit, when compared with continuous energy curing units, because a pulsed energy unit is required to be on only when a substrate is being cured. Pulsed energy curing units are either on or off, and typically do not require a warm-up period, whereas continuous energy emitting curing units need warm-up periods before emitting useful levels of energy. To avoid warm-up periods between the curing of one topcoated substrate to the next, the continuous energy emitting curing units must be left on, which can waste useful energy and generate excess heat. On equipment, such as in an office environment for example, where intermittent use is common, a pulsed energy curing unit enables more efficient use.

Curing unit walls 41 preferably completely enclose and secure curing unit 40 in such a manner that curing unit entrance 43 and curing unit exit 43a are the only openings through which energy emitted from energy source 42 can escape. This type of secure unit can limit significant amounts of energy, such as radiation, from escaping from the unit.

Coated polymeric substrate 37 should remain in curing unit 40 long enough to cure topcoat layer 12. Typically, when using one of the above-listed curing units, polymeric substrate 37 is in curing unit 40 for about 0.5 to 5 seconds.

As shown in FIG. 5, transporting mechanism 30, transports topcoated polymeric substrate 37 through curing unit 40. As illustrated, transporting mechanism 30 is topcoat film 10, without cover film 13, from topcoat film application roll 36 to base film removal system 44.

Transporting mechanism 30 then transports coated polymeric substrate 37 from curing unit 40 to base film removal system 44. Base film removal system 44 includes base film take up spool 45 and base film removal roller 46. Transporting mechanism 30 transports coated polymeric substrate 37 so that it makes contact with base film removal roller 46, which removes base film 11. Upon curing, topcoat layer 12 typically has greater adhesion to polymeric substrate 37 than to base film 11. This greater adhesion allows base film 11 to be stripped cleanly away from topcoat layer 12. Once base film 11 is removed, topcoat layer 12 remains on polymeric substrate 37, and card 21 is formed. Base film 11 is then wound into base film take up spool 45, and card 21 is transported through two sets of transport rollers 47 and 47a in a direction away from curing unit 40, as indicated by the directional arrow in FIG. 5. Preferably, rollers 47 and 47a are the same type of rubber rollers as rollers 36a.

It is to be understood that any one of topcoat films 10, 10A, 15, 15A can be used in this cure then strip method to form a data carrying device. However, if topcoat film 10A or 15A is used, then the cover film take up spool 32 and cover film removal roller 34 are not needed in the process, because topcoat films 10A and 15A do not include a cover film.

It is also understood that location detection devices, such as photocells, can be included in various stages of processes of the invention in order to insure accurate placement of the polymeric substrate during the process. For example, a location detection device for detecting the location of polymeric substrate 22 could be placed in front of rollers 36a in such a manner that the location of polymeric substrate 22 is detected prior to its contacting rollers 36a. Placement of location detection devices is more fully discussed below.

Figure 6:
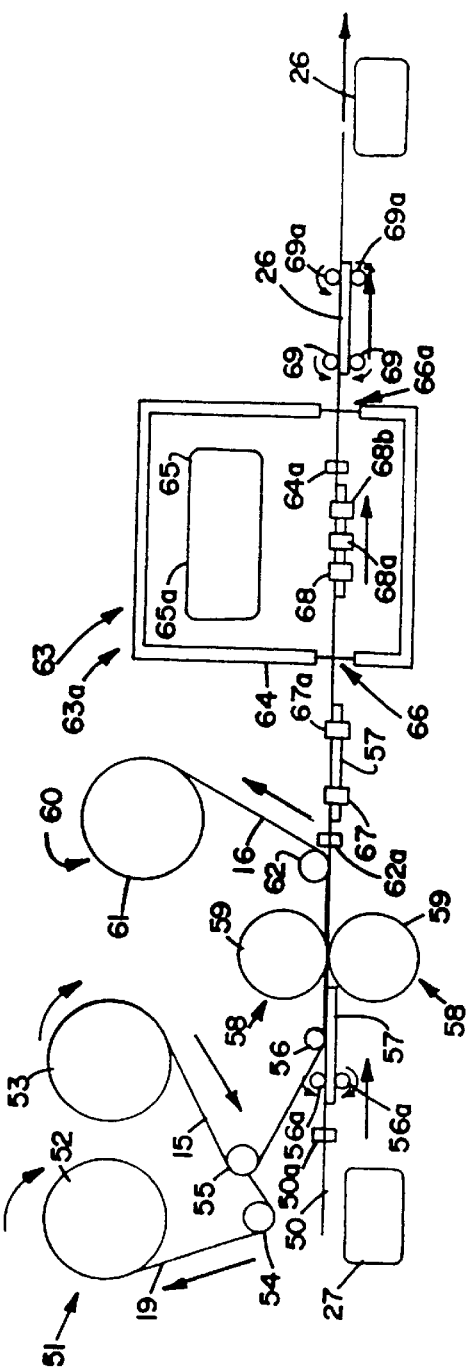
FIG. 6 schematically illustrates a second preferred process for preparing a data carrying device of the invention, FIG. 6A illustrated a preferred data carrying device of the invention as it is transported through a set of two pairs of rollers that are included in the process illustrated in FIG. 6.

In another preferred process of the invention, as illustrated in FIG. 6, card 26 is prepared. Polymeric substrate 27, which is analogous to polymeric substrate 22, is placed on transporting mechanism 50, which is generally analogous to transporting mechanism 30.

Figure 7:
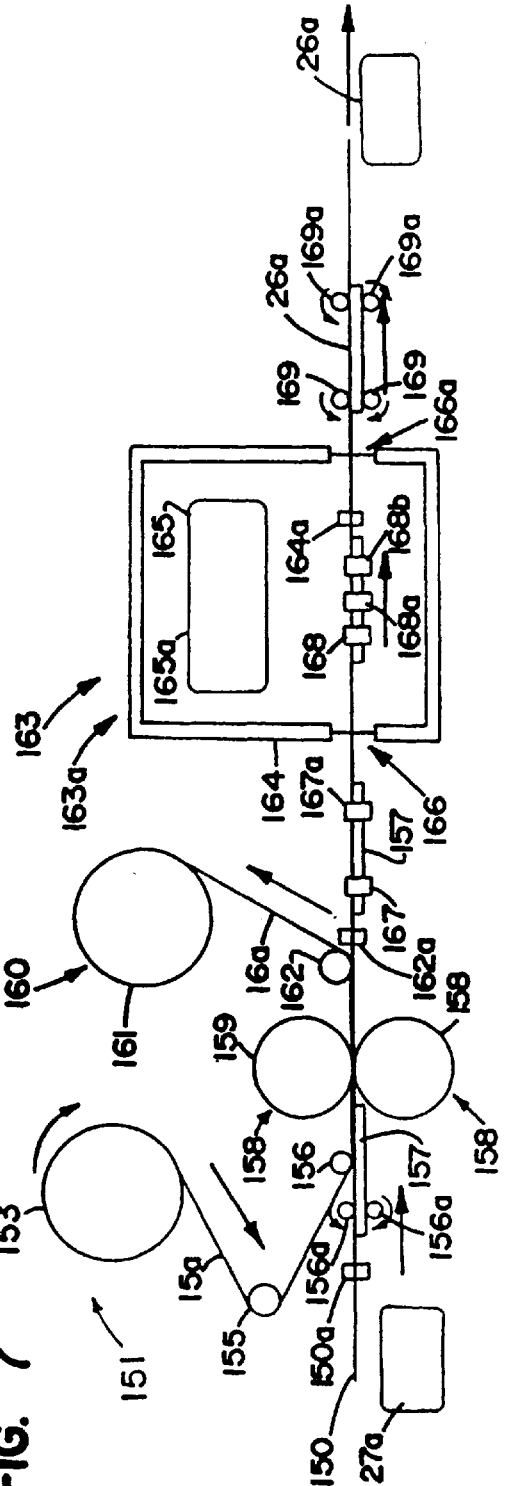
FIG. 7 illustrates a third preferred process for printing a data carrying device of the invention.

The processes illustrated in FIGS. 6 and 7 are both strip then cure processes. Thus, additional rollers, as more fully discussed below, are included in transporting mechanism 50, because base film 16 is removed from topcoat film 15 prior to curing, and therefore, topcoat film 15 having base film 16 therein cannot be a transport mechanism for polymeric substrate 57 into the curing process.

Once placed on transport mechanism 50, polymeric substrate 27 is detected by location detection device 50a. Location detection device 50a is preferably a photocell. Most preferably location detection device 50a is a photocell that detects a trailing edge of polymeric substrate 27 for accurate placement of polymeric substrate 27 as it travels between rollers 56a.

Cover film removal and topcoat film application system 51, which is analogous to system 31, removes cover film 19 from topcoat film 15 and applies topcoat film 15 without cover film 19 to polymeric substrate 27.

Cover film removal and topcoat film application system 51 includes cover film take up spool 52 (which is analogous to cover film take up spool 32), topcoat film supply spool 53 (which is analogous to topcoat film supply spool 33), cover film removal roller 54 (which is analogous to cover film removal roller 34), cover film separation roller 55 (which is analogous to cover film separation roller 35), and topcoat film application roller 56 (which is analogous to topcoat film application roller 36). Once prepared as described above, topcoat film 15 is rolled into topcoat film supply spool 53. When topcoat film supply spool 53 is to be used in the process the end of topcoat film 15 is threaded through cover film removal and topcoat film application system 51. Cover film 19 is separated from topcoat film 15, and Ned around cover film separation roller 54 and into cover film take up spool 52. Once placed on transporting mechanism 50, polymeric substrate 27 is hard to transport rollers 56a, which are analogous to transport rollers 36a.

As previously discussed with respect to the cure then strip process illustrated in FIG. 5, if a release coat is included on the base film in the topcoat film, then the topcoat film is self-wound, and a cover film removal system is not needed. Therefore, for preparation of a data carrying device using a self-wound film, such as topcoat film 10A or 15A, over film take up spool 52 and cover film removal roller 54 would not be needed in the process. This is illustrated in FIG. 7 and discussed more fully below.

Cover film removal and topcoat film application system 51 operates continuously. Thus, cover film 19 is continuously removed from topcoat film 15, while topcoat film 15, without cover film 19, is applied to polymeric substrate 27. It is noted that cover film removal and topcoat film application system 51 is arranged in such a manner that no rollers come in contact with topcoat layer 18, once cover film 19 is separated from topcoat film 15, and topcoat layer 18 is exposed.

After passing location detection device 50a, polymeric substrate 27 is transported by rollers 56a to topcoat film application roll 56, where topcoat film 15, without cover film 19, is applied to polymeric substrate 27 to form coated polymeric substrate 57.

Coated polymeric substrate 57, having topcoat film 15, without cover film 19 thereon, is then transferred by transporting mechanism 50 (which at this point is topcoat film 15 without cover film 19 thereon) to laminating rolls 58, which are analogous to laminating rolls 38. It is noted that if a self-wound topcoat film is used in the process, then the self-wound topcoat film is the transporting mechanism at this point in processes of the invention. As the leading edge of polymeric substrate 57 approaches laminating rolls 58, topcoat film 15, without cover film 19, is advanced and the gap between laminated rolls 58 is narrowed in preparation for application of pressure to coated polymeric substrate 57. Laminating rolls 58 laminate topcoat film 15, without cover film 19, to coated polymeric substrate 57.

It is noted that generally any type of roller that does not strongly adhere to or interfere with the integrity of the topcoat layer, base film, release coat, or cover film can be used as a film guide roller, separation roller, or removal roller.

Transporting mechanism 50 (which at this point includes topcoat film 15 and laminating rolls 58) then transports coated polymeric substrate 57 to base film removal system 60. Base film removal system 60 includes base film take up spool 61 and base film removal roller 62. Coated polymeric substrate 57 makes contact with base film removal roller 62, and base film 16 is removed from coated polymeric substrate 57. Base film 16 is then wound into base film take up spool 61, which is a driven spool. With the removal of base film 16, topcoat layer 18 and release layer 17 remain on coated polymeric substrate 57. Release layer 17 can facilitate separation of uncured topcoat layer 18 from base film 16. Furthermore, release layer 17 can protect uncured topcoat layer 18 from exposure to air, which can cause significant cure inhibition of topcoat layer 18. Release layer 17 is an optional layer in topcoat films of the invention. Whether it is included in topcoat films of the invention can depend upon the particular application in which the topcoat film is to be used.

If a self-wound topcoat film is used in this process, then the release coat would simultaneously be removed with the base film by base film removal system 60.

Transporting mechanism 50 then transports coated polymeric substrate 57 (i.e., having release layer 17 and topcoat layer 18 thereon) by location detection device 62a, which in most preferred embodiments is a photocell. As the trailing portion of coated polymeric substrate 57 is being driven toward base film removal system 60 by laminating rolls 58, the leading portion of coated polymeric substrate 57 is being transported past location detection device 62a and accepted by rollers 67 and 67a.

In most preferred embodiments, location detection device 62a detects the leading edge of coated polymeric substrate 57 for positioning accuracy. Once location detection device 62a detects coated polymeric substrate 57, then the gap between laminating rolls 58 is increased so that laminating rolls 58 typically do not come in contact with any of topcoat film 15 that is not applied to polymeric substrate 27.

Generally, in processes of the invention, the Sporting mechanisms are spaced in such a manner that the polymeric substrate is continuously moving or is capable of continuously being moved. Thus, when rollers, for example, are the only transporting mechanism means, then the rollers are spaced in such a manner that a polymeric substrate is simultaneously being ejected by one set of rollers and accepted by another set of rollers.

Preferably, rollers 67 and 67a are useful types of roughened rollers, which provide the rollers with extra grip capability while transporting coated polymeric substrate 57. One useful type of roughened roller is a grit-coated metal roller. Useful types of grit-coated metal rollers are available as Tungsten Carbide grit-coated rollers from TUNCO® Manufacturing, Inc. of Flowery Branch, Ga. Applicants have found that grit-coated rollers facilitate exact positioning of polymeric substrates while being transported through the process.

Figure 6B:
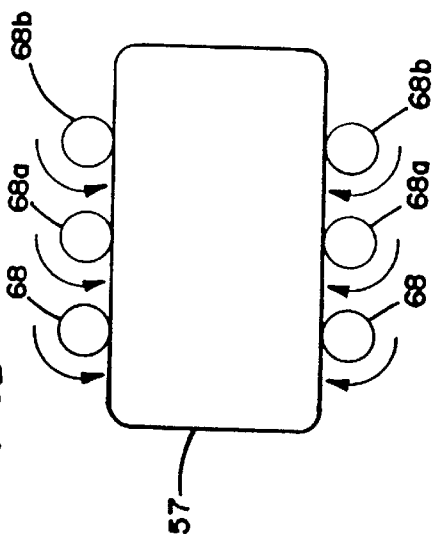
FIG. 6B illustrates a preferred data carrying device of the invention as it is transported through a set of three pairs of rollers that are included in the process illustrated in FIG. 6.
Figure 6A:
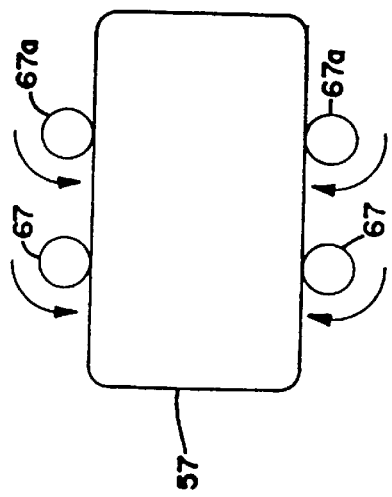

In FIG. 6A, a top view of rollers 67 and 67a and polymeric substrate 57 is depicted as polymeric substrate 57 is transported through rollers 67 and 67a. As shown in FIG. 6A, use of rollers 67 and 67a as transporting mechanism 50 at this point, allow coated polymeric substrate 57 to be transported without transporting mechanism 50 contacting exposed uncured topcoat layer 18.

Transporting mechanism 50 (i.e., rollers 67 and 67a at this point in the process) then transports coated polymeric substrate 57 (i.e. having release layer 17 and topcoat layer 18 thereon) to curing unit 63, which is analogous to curing unit 40.

Curing unit 63 is a UV curing unit 63a, which is analogous to UV curing unit 40a, and it includes curing unit walls 64, location detection device 64a, curing unit entrance door 66, curing unit exit door 66a, and energy source 65, which can be a UV source 65a. While coated polymeric substrate 57 is being transported by driven rollers 67 and 67a toward curing unit 63, curing unit entrance door 66 is opened, and coated polymeric substrate 57 is transported to rollers 68, 68a, and 68b, which are located inside of curing unit 63. Once coated polymeric substrate 57 is inside of curing unit 63, curing unit entrance door 66 is closed, curing unit exit door 66a is closed, and energy source 65 is activated. As discussed previously with respect to curing unit 40, preferably curing units of the invention can be fully secured to prohibit significant amounts of stray energy from escaping into the ambient environment outside of the curing unit While in UV curing unit 63a, coated polymeric substrate 57 gets exposed to at least about 250 mj/cm$^2$ and not greater than about 2000 mj/cm$^2$ of energy. Curing unit 63, can be any type of curing unit useable in a curing process. Preferably, curing units of of the invention are relatively easy to use and are office-size so processes of the invention can be performed in an office environment by unskilled laborers. Polymeric substrate 57 should be exposed to UV for a sufficient time to cure topcoat layer 18. Once topcoat layer 18 is cured, card 26 is formed.

Polymeric substrate 57 is transported through three sets of rollers 68, 68a and 68b, which are located inside curing unit 63. These rollers preferably are suitably roughened rollers, such as metal grit-coated rollers that are analogous to rollers 67 and 67a. In FIG. 6B, a top view of rollers 68, 68a and 68b and polymeric substrate 57 is depicted as polymeric substrate 57 is transported through rollers 68, 68a and 68b. As shown in FIG. 6B, rollers 68, 68a, and 68b are oriented such that they do not touch the faces of coated polymeric substrate 57.

Once coated polymeric substrate 57 has been cured, curing unit exit door 66a is opened, and card 26 is transported passed curing unit location detection device 64a, and into driven rollers 69 and 69a for transport into additional systems for processing. Most preferably, location detection device 64a is a photocell that detects the leading edge of card 26 as it is transported from rollers 68, 68a, and 68b. Location detection devices 50a, 62a, and 64a are generally analogous. However, unlike the other location detection devices included in these processes, curing unit location detection devices must be capable of withstanding (i.e., remaining operational and maintaining their integrity) the high energy environment within the curing units included in the processes of the invention.

This is also true for rollers included in the curing units of the invention. The suitably roughened rollers included in processes of the invention are generally analogous. However, the rollers included within curing units of the invention must be capable of withstanding (i.e. maintaining their integrity) the high energy environment of the curing unit.

Upon exit from curing unit 63, card 26 is transported through two sets of transport rollers 69 and 69a, which are analogous to transport rollers 56a, which preferably are rubber transport rollers.

Figure 7B:
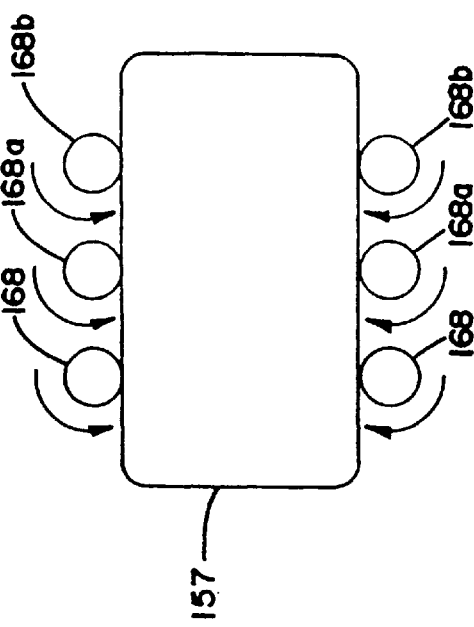
FIG. 7B illustrates a preferred data carrying device of the invention as it is transported through a set of three pairs of rollers that are included in the process illustrated in FIG. 7.
Figure 7A:
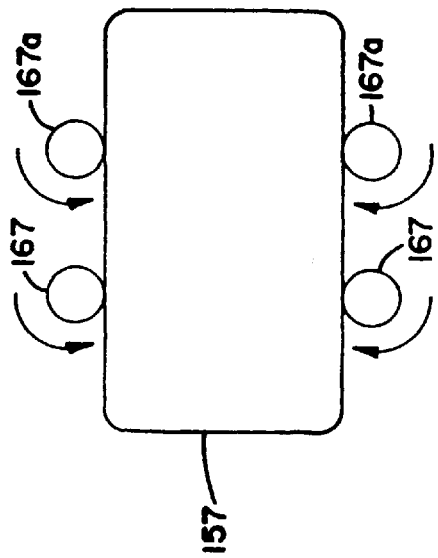
FIG. 7A illustrates a preferred data carrying device of the invention as it is transported through a set of two pairs of rollers that are included in the process illustrated in FIG. 7.

The strip then cure process illustrate in FIGS. 7, 7A, and 7D is analogous to the process illustrated in FIGS. 6, 6A, and 6B. The primary difference is the topcoat film 15a used in the process illustrated in FIG. 7 does not have a cover film, so a cover film removal system was not included in the process illustrated in FIG. 7.

Referring now to FIG. 7, once placed on transport mechanism 150, polymeric substrate 27a is detected by location detection device 150a, which is analogous to location detection device 50a. Location detection device 150a is preferably a photocell. Most preferably location detection device 150a is a photocell that detects a trailing edge of polymeric substrate 27a for accurate placement of polymeric substrate 27a as it travels between rollers 156a.

Topcoat film application system 151 applies topcoat film 15a to polymeric substrate 27a. It is noted that topcoat film 15a includes a release layer and a release coat; however, this process can be used for any topcoat film of the invention that does not include a cover film regardless of whether it has a release coat and/or a release layer.

Topcoat film application system 151 includes topcoat film supply spool 153, which is analogous to topcoat film supply spool 53, topcoat film guide roller 155, which is analogous to cover film separation roller 55, and topcoat film application roller 156, which is analogous to topcoat film application roller 56.

Once present as described above, topcoat film 15a is rolled into topcoat film supply spool 153. When topcoat film supply spool 153 is to be used in the process, the end of topcoat film 15a is leaded through topcoat film application system 151.

Once placed on transporting mechanism 150, polymeric substrate 27a is transported passed location detection device 150a and to transport rollers 156a, which are analogous to transport rollers 56a.

Topcoat film application system 151 operates continuously. It is noted that topcoat film application system 151 is arranged in such a manner that no rollers come in contact with topcoat layer 18a, while it is exposed to the atmosphere.

After passing location detection device 150a, polymeric substrate 27a is transported by rollers 156a to film application roll 156, where topcoat film 15a is applied to polymeric substrate 27 a to form coated polymeric substrate 157.

Coated polymeric substrate 157, having topcoat film 15a thereon, is then transferred by transporting mechanism 150 (which at this point is topcoat film 15a) to laminating rolls 158, which are analogous to laminating rolls 58. As the leading edge of polymeric substrate 157 approaches laminating rolls 158, topcoat film 15a is advanced, and the gap between laminated rolls 158 is narrowed in preparation for application of pressure to coated polymeric substrate 157. Laminating rolls 158 laminate topcoat film 15a to coated polymeric substrate 157.

Transporting mechanism 150 (which at this point includes topcoat film 15a and laminating rolls 158) then transports coated polymeric substrate 157 to base film removal system 160, which is analogous to base film removal system 60. Base film removal system 160 includes base film take up spool 161 and base film removal roller 162. Coated polymeric substrate 157 makes contact with base film removal roller 162, and base film 16a is removed from coated polymeric substrate 157. Base film 16a is then wound into base film take up spool 161, which is a driven spool. With the removal of base film 16a, topcoat layer 18a and release layer 17 a remain on coated polymeric substrate 157. Release layer 17a can facilitate separation of uncured topcoat layer 18a from base film 16a. Furthermore, release layer 17a can protect uncured topcoat layer 18a from exposure to air, which can cause significant cure inhibition of topcoat layer 18a. Release layer 17a is an optional layer in topcoat films of the invention. Whether it is included in topcoat films of the invention can depend upon the particular application in which the topcoat film is to be used. Since topcoat film 15a is self-wound, release coat 19a is simultaneously removed with the base film by base film removal system 160.

Transporting mechanism 150 then transports coated polymeric substrate 157 (i.e., having release layer 17a and topcoat layer 18a thereon) by location detection device 162a, which is analogous to location detection device 62a and which in most preferred embodiments is a photocell. As the trailing portion of coated polymeric substrate 157 is being driven toward base film removal system 160 by lamninating rolls 158, the leading portion of coated polymeric substrate 157 is being transported passed location detection device 162a and accepted by rollers 167 and 167a, which are analogous to rollers 67 and 67a.

In most preferred embodiments, location detection device 162a detects the leading edge of coated polymeric substrate 157 for positioning accuracy. Once location detection device 162a detects coated polymeric substrate 157, then the gap between laminating rolls 158 is increased so that laminating rolls 158 typically do not come in contact with any of topcoat film 15a that is not applied to polymeric substrate 27a.

Preferably, rollers 167 and 167a are useful types of roughened rollers, which provide the rollers with extra grip capability while transporting coated polymeric substrate 157, as discussed previously.

In FIG. 7A, a top view of rollers 167 and 167a and polymeric substrate 157 is depicted as polymeric substrate 157 is transported through rollers 167 and 167a. As shown in FIG. 7A, use of rollers 167 and 167a as transporting mechanism 150 at this point, allow coated polymeric substrate 157 to be transported without transporting mechanism 150 contacting exposed uncured topcoat layer 18a.

Transporting mechanism 150 (i.e., rollers 167 and 167a at this point in the process) then transports coated polymeric substrate 157 (i.e. having release layer 17a and topcoat layer 18a thereon) to curing unit 163, which is analogous to curing unit 63.

Curing unit 163 is a UV curing unit 163a, which is analogous to UV curing unit 63a, and it includes curing unit walls 164, location detection device 164a, curing unit entrance door 166, curing unit exit door 166a, and energy source 165, which can be a UV source 165a. While coated polymeric substrate 157 is being transported by driven rollers 167 and 167a toward curing unit 163, curing unit entrance door 166 is opened, and coated polymeric substrate 157 is transported to rollers 168, 168a, and 168b, which are located inside of curing unit 163. Once coated polymeric substrate 157 is inside of curing unit 163, curing unit entrance door 166 is closed, and curing unit exit door 166a is closed, and energy source 165 is activated. As discussed previously with respect to curing unit 40, preferably curing units of the invention can be fully secured to prohibit significant amounts of stray energy from escaping into the ambient environment outside of the curing unit.

While in UV curing unit 163a, coated polymeric substrate 157 gets exposed to at least about 250 mj/cm$^2$ and not greater than about 2000 mj/cm$^2$ of energy.

Polymeric substrate 157 should be exposed to UV for a sufficient time to cure topcoat layer 18a. Once topcoat layer 18a is cured, card 26a is formed.

Polymeric substrate 157 is transported through three sets of rollers 168, 168a and 168b, which are located inside curing unit 163 and are analogous to rollers 68, 68a, and 68b. These rollers preferably are suitably roughened rollers, such as metal grit-coated rollers, analogous to rollers 167 and 167a. In FIG. 7B, atop view of rollers 168, 168a and 168b and polymeric substrate 157 is depicted as polymeric substrate 157 is transported through rollers 168, 168a and 168b. As shown in FIG. 7B, rollers 168, 168a, and 168b are oriented such that they do not touch a face of coated polymeric substrate 157.

Once coated polymeric substrate 157 has been cured, curing unit exit door 166a is opened, and card 26a is transported passed curing unit location detection device 164a, which is analogous to device 64a, and into driven rollers 169 and 169a for transport into additional systems for processing. Most preferably, location detection device 164a is a photocell that detects the leading edge of card 26a as it is transported from rollers 168, 168a, and 168b. Location detection devices 150a, 162a, and 164a are generally analogous.

Upon exit from cuing unit 163, card 26a is transported through two sets of transport rollers 169 and 169a, which are analogous to transport rollers 156a, which preferably are rubber transport rollers.

Apparatus Useful For Preparing Data Carrying Devices

Apparatus useful for preparing data carrying devices of the invention typically include a topcoat film supply and application system, a laminating system, a base film removal system, a curing system, and a transport system. An embodiment of the apparatus of the invention can also include, a cover film removal system.

Generally, any topcoat film supply and application system useful in preparing multi-layered laminates, such as data carrying devices, is useable in the invention to supply and apply topcoat film to a polymeric substrate. Preferably, this system is a reel and roller type of supply and application system. As mentioned previously in reference to the Figures, generally, preferred systems of this type include a topcoat film supply reel or spool, a topcoat film application roller, and/or a topcoat film guide roller.

Any laminating system generally useful to laminate films and/or substrates in a multi-layered laminate preparation process is useful in the invention. Laminating systems included in apparatus of the invention usually include, laminating rolls and any other equipment necessary for lamination of a topcoat film to a polymeric substrate. Preferably, as discussed previously, the laminating rolls included in the apparatus are nip rolls that have an adjustable gap between the rollers. Preferably, the laminating rolls used in the present invention are heated and provide a load of about 100 pounds.

A base film removal system is also included in an apparatus of the invention for removing the base film in the topcoat film from the topcoat film. Any type of base film removal system that is useful in the preparation of multi-layered laminates is useful in the invention. Preferably, the base removal system is a take up reel or spool type of system. Typical base film removal systems included in the invention include a base film take up spool or reel and a base film removal roller.

Base film removal systems can be included anywhere in the apparatus. However, Applicants have found that three are several advantages to placing the base film removal system prior to the curing system, as discussed previously with respect to the strip then cure processing method.

Any curing system useful to cure a multi-layered laminate having a polymeric substrate therein is generally useful in the invention. The curing system included in the invention can use any type of energy source to cure the topcoat layer as long as it is compatible with any polymerization initiator included in the topcoat layer (i.e. a heat initiated polymerization initiator should be used if a heat based energy source is used for curing.).

Applicants have found that typically about 900 mj/cm$^2$ of continuous energy are needed in order to cure the coated polymeric substrates and form data carrying devices of the invention. However, Applicants have found that curing units that are readily turned off when a device is actually not being cured are preferable, because they typically are more suitable for an office environment due to size, less wasted heat and less exposure by operators to stray energy.

Preferably, the curing unit contains a pulsed energy emitting source. There can be several advantages to using this type of energy emitter. For example, as discussed previously, the curing unit can be more easily cooled, and its size would typically be more conductive to an office environment when compared to a continuous energy emitting source.

Generally, any transporting system useable in a multi-layered laminate preparation process for items such as data carrying devices is useful in the invention. For example, a vacuum belt conveyor system or a suction cup transfer system could work in the apparatus of the invention. However, Applicants most prefer a transporting system that does not require transportation equipment to come in contact with the face or large surfaces of the data carrying devices of the invention subsequent to the lamination process. Typically, these surfaces have inks, topcoat or other types of films or layers thereon, and contact of these surfaces with conveyors, rollers or other such equipment should be avoided, because this equipment could impart undesirable patterns, contamination and/or weak points in devices of the invention.

As discussed previously, the topcoat film of the invention itself can be included in the transport system. In addition, rollers are useful in transporting substrates through the apparatus. Rollers can eject and hand off substrate used to prepare devices of the invention to other rollers without having some transport mechanism (e.g. a conveyor belt) connecting the different rollers. As previously disclosed, rubber and/or grit-coated rollers are preferred The rollers can be slightly angled (i.e., less than 5 degrees) in order to provide some direction to the path on which a substrate moves through the apparatus.

Stability and Plasticizer Resistance Testing

Data carrying devices of the invention are stable and preferably can have improved overall durability, stability, plasticizer resistance, adhesion, abrasion resistance, flexibility, and UV resistance when compared to data carrying devices not having a topcoat composition or layer thereon.

Data carrying devices of the invention all pass the following STABILITY Test. Two data carrying devices of the invention (e.g., cards) having thermal transfer printed or dye diffusion printed matter thereon are placed in a container that readily conducts heat and has at least ⅛ of an inch of water on the bottom. The container is sealed. The entire top surface of each device must be exposed to air above the water. The sealed container is then put in an oven at a temperature of about 40° C. for a period of about one week (i.e. 7 days).

The container is removed from the oven, and the devices are removed from the container and allowed to cool to room temperature. After cooling, the devices are examined for signs of dye or printed matter bleeding and topcoat layer bubbling. If there are no signs to the visible eye of dye or printed matter bleeding, and the topcoat layer has not physically changed, then the devices pass the STABILITY test and are stable.

Data carrying devices of the invention preferably have improved plasticizer resistance when compared with devices not incorporating the topcoat composition of the invention. Plasticizer resistance is measured in accordance with the following PLASTICIZER Test Preferably devices of the invention pass the Plasticizer Test.

First, all of the devices are to be Flex tested. Flex testing shows how well the topcoat layer resists crack propagation. The devices (e.g. cards) are flexed according to the flex test described below. In accordance with the PLASTICIZER Test these devices are flexed in the long direction for 300 cycles with the topcoat layer up and then 300 cycles with the topcoat layer down. Next the cards are flexed in the short direction for 300 cycles with the topcoat layer up and 300 cycles with the topcoat layer down.

The devices were flexed in order to simulate the bending that a card or data carrying device receives when it is handled or is placed in a wallet that is subsequently pocketed. The flex test apparatus consists of two jaws. One jaw is fixed, but is adjustable for gap, and the other jaw is movable. An apparatus usable for this test is commercially available from Eclipse Laboratories of Minneapolis, Minn.

The movable jaw oscillates back and forth, which causes the cards or data carrying devices to be flexed. The stroke length of the apparatus should be adjustable. The flex rate is about 60 flexes per minute. The flex tester set up varies with the direction of the flex. When the card is flexed in the short direction, the flex tester is set up with a closed gap of 1.870 inches, and the stroke length is set to 0.400 inches. When the card is flexed in the long direction, the flex test is set up with a closed gap of 2.228 inches, and the stroke length is set to 0.570 inches.

The flex tester is first set up to flex in the short direction. The devices are then placed in the flex tester, topcoat layer side up and are flexed for 300 cycles. The devices are then flipped so that the topcoat layer is down, and they are flexed for 300 more cycles.

The flex tester is then set up to flex in the long direction. The devices are placed in the flex tester in the long direction, topcoat layer side up and are flexed for 300 cycles. The devices are then placed in the flex tester, topcoat layer down and are flexed for 300 more cycles. The devices are then removed from the flex tester and are gently bent until the cards are reasonably close to flat again.

Next, in accordance with the PLASTICIZER Test a No. 10 wire wound rod (i.e., commercially available from RD Specialties of Webster, N.Y.) is used to coat the entire surface of the device having the topcoat layer thereon with dioctyl phthalate (MOP). After coating, a 1 mil untreated polyester cover sheet is placed over the DOP to hold it in place.

Each device is then placed on a steel sheet (i.e., to aid inserting and removing from the oven). This sheet is placed in an oven having a temperature of 40° C. to accelerate plasticizer attack. After 24 hours, two of the four cards or devices that are involved in this plasticizer test are removed from the oven. These two cards are allowed to cool and are washed with soap and water.

After being washed with soap and water, these two cards or devices are examined for signs of topcoat layer degradation and dye migration. If there are no signs to the visible eye of dye or printed matter bleeding, and the topcoat layer has not changed to the visible eye, then the devices pass the PLASTICIZER Test. The four cards or devices used in this test have printed matter on the surface having the topcoat layer thereon. Preferably, the printed matter is printed using a dye diffusion or thermal transfer printing technique. Magnification for examination of these two cards is recommended. Preferably, a magnification of 3.5 times is used. Photographs of these devices are also taken for comparisons to the grading scale described below. The test conditions of these two devices are recorded on the photographs and are stored for future observation After 48 hours of exposure to DOP, two more cards or devices are removed from the oven. These two devices are allowed to cool and are washed with soap and water. These two devices are then visually examined as previously described.

EXAMPLES

EXAMPLE 1

Preparation of a Curable Composition of the Invention

A curable composition of the invention was prepared as follows. ELVACITE 2051 (15% solid solution of methyl metharylate polymer) available from ICI Resins of Wilmington, Del. in an amount of 35 parts per hundred was combined with VINAC B-15 (20% solid solution of polyvinyl aceate polymer) commercially available from Air Products Chemical Company of Allentown, Pa. in an amount of 9.75 parts per hundred. Trimethylolpropane triacylate monomer commercially available from Sartomer of Exton, Pa. as SR 351 was combined with the polymer mixture in an amount of 3.00 parts per hundred. Ethoxylated trimethylolpropane triacrylate commercially available from Sartomer of Exton, Pa. as SR 454 was added to the mixture in an amount of 4.35 parts per hundred.

IGRACURE® 184, a photoinitiator, commercially available from Ciba-Geigy Company of Hawthorne, N.Y. was added to the mixture in an amount of 0.40 parts per hundred. 2-mercaptobenzoxazole was added to the mixture in an amount of 0.05 parts per hundred. Methyl ethyl ketone was added to the mixture in an amount of 47.45 parts per hundred. The composition was mixed under high shear until homogeneous.

EXAMPLE 2

Preparation of a Curable Topcoat Film

A curable composition was in accordance with Example 1. The composition was applied to a base film made of polyethylene terephthalate, commercially available as HOSTAPHAN 5000 from Hoechst Corp. The composition was applied using a machine coating process. A gravure type of coating process was used. Equipment commercially available from Yasui Seiki as model number CPR-S was used to coat the base film with the curable composition The base film was 12.7 μm thick.

The solvent was evaporated from the composition, after it was applied to the base film, using a forced air drying oven.

Once dried, the topcoat layer was about 7 μm thick. A cover film that was 25.4 μm thick was laminated the topcoat layer. The cover film was polypropylene which is commercially available from Toray Plastics America, Inc. of North Kingston, R.I. The laminating was done using laminating nip rollers at room temperature as is known in the art. Once the cover film was laminated onto the topcoat layer, the topcoat film was complete.

EXAMPLE 3

Preparation of a Second Curable Topcoat Film

A topcoat film was prepared in accordance with Example 2 with the following exceptions. A release composition was prepared by combining 3 parts per hundred of a wax, which is commercially available from Hoechst Celanese of Somerville, N.J. as HOECHST WAX OP with 97 parts per hundred toluene. The wax was melted at 110° C., and the solvent was heated to about 60° C. prior to combining. Once heated, the solvent and wax were mixed and cooled to room temperature with vigorous stirring.

This composition was applied to the base film using the gravure type of coating process disclosed in Example 2. The toluene was then evaporated from the release composition using methods well known in the art. Once the toluene was evaporated from the release composition, a release layer formed. Once dried, the release layer was 0.5 μm thick.

Then the topcoat composition of Example 2 was applied, to the release layer using a gravure type of coating process. The release layer was supported by a type of base film disclosed in Example 2. As in Example 2, a cover film was then laminated to the topcoat layer, and a topcoat film of the invention was formed.

EXAMPLE 4

Preparation of a Third Curable Topcoat Film

A topcoat film was prepared in accordance with Example 2. The topcoat composition had the follow formulation:

|  | PPH |
|---|---|
| ELVACITE 2051 (15% solid solution) | 36.00 |
| VINAC B-15 (20% solid solution) | 9.75 |
| Ethoxylated TMPTA, Sartomer SR 454 | 7.20 |
| IGRACURE ® 184 | 0.40 |
| 2-mercapto benzoxazole | 0.05 |
| methyl ethyl ketone | 46.60 |

EXAMPLE 5

Preparation of a Fourth Curable Topcoat Film

A topcoat film was preferred in accordance with Example 2. The topcoat composition had the following formulation:

|  | PPH |
|---|---|
| ELVACITE 2051 (15% solid solution) | 36.00 |
| VINAC B-15 (20% solid solution) | 9.75 |
| TMPTA, Sartomer SR 351 | 7.20 |
| IGRACURE ® 184 | 0.40 |
| 2-mercapto benzoxazole | 0.05 |
| methyl ethyl ketone | 46.60 |

EXAMPLE 6

Preparation of an Fifth Curable Topcoat Film

A topcoat film was prepared in accordance with Example 4. The topcoat composition had the following formulation:

|  | PPH |
|---|---|
| ELVACITE 2051 (15% solid solution) | 35.00 |
| VINAC B-15 (20% solid solution) | 9.75 |
| TMPTMA, Sartomer SR 350 | 3.00 |
| TEOTA, Sartomer SR 454 | 4.35 |
| IGRACURE ® 184 | 0.40 |
| 2-mercapto benzoxazole | 0.05 |
| methyl ethyl ketone | 47.45 |

EXAMPLE 7

Testing Curable Topcoat Films for Flexibility and Abrasion/Plasticizer Resistance Topcoat Films having differing amounts of trimethylolpropane triacrylate (TMPTA) and ethoxylated trimethylolpropane triacrylate (TEOTA) were prepared and tested for stability, flexibility and abrasion/plasticizer resistance using the STABILITY and PLASTICIZER tests described in the detailed description of the invention. Trimethylolpropane triacylate (TMPTA) was obtained from Sartomer Company of Exton, Pa. as SR 351. Ethoxylated trimethylolpropane triacrylate (degree of ethoxylation=3) (TEOTA-3) was obtained from Sartomer as SR 454. Ethoxylated trimethylolpropane triacrylate (degree of ethoxylation=15) (TEOTA-15) was obtained from Sartomer as SR 9035.

| Composition #1: | |
|---|---|
| Ingredient | Parts by Weight |
| ELVACITE 2051 (15% solid solution) | 58.33 |
| VINAC B-15 (20% solid solution) | 16.25 |
| SR351 (TMPTA) | 5.00 |
| SR 454 (TEOTA-3) | 7.25 |
| SR 9035 (TEOTA-15) | 0 |
| IGRACURE ® 184 | 0.75 |
| methyl ethyl ketone | 12.42 |

Composition #1 was prepared as described in Example 1. The composition was then applied to a polyester film as described in Example 2 to form a topcoat film with a thickness of about 5–7 μm. The topcoat film was then transferred to a polyvinylchloride (PVC) card and cured as described in the detailed description. The coated card was tested using the STABILITY and PLASTICIZER tests described above. The coating cracked when flexed and embossed.

| Composition #2: | |
|---|---|
| Ingredient | Parts by Weight |
| ELVACITE 2051 (15% solid solution) | 58.33 |
| VINAC B-15 (20% solid solution | 16.25 |
| SR 351 (TMPTA) | 0 |
| SR 454 (TEOTA-3) | 12.25 |
| SR 9035 (TEOTA-15) | 0 |
| IGRACURE ® 184 | 0.75 |
| methyl ethyl ketone | 12.42 |

Composition #2 was prepared and tested as described above. The coating cracked when flexed or embossed.

| Composition #3: | |
|---|---|
| Ingredient | Parts by Weight |
| ELVACITE 2051 (15% solid solution) | 58.33 |
| VINAC B-15 (20% solid solution) | 16.25 |
| SR 351 (TMPTA) | 0 |
| SR 454 (TEOTA-3) | 0 |
| SR 9035 (TEOTA-15) | 12.25 |
| IGRACURE ® 184 | 0.75 |
| methyl ethyl ketone | 12.42 |

Composition #3 was prepared and tested as described above. The coating did not crack when flexed or embossed. However, the coating had poor plasticizer resistance.

| Composition #4: | |
|---|---|
| Ingredient | Parts by Weight |
| ELVACITE 2051 (15% solid solution) | 58.33 |
| VINAC B-15 (20% solid solution) | 16.25 |
| SR 351(TMPTA) | 0 |

-continued

Composition #4:

| Ingredient | Parts by Weight |
|---|---|
| SR 454 (TEOTA-3) | 6.125 |
| SR 9035 (TEOTA-15) | 6.125 |
| IGRACURE ® 184 | 0.75 |
| methyl ethyl ketone | 12.42 |

Composition #4 was prepared and tested as described above. Although no cracking was observed during embossing or flexing, the coating displayed poor stability.

Composition #5:

| Ingredient | Parts by Weight |
|---|---|
| ELVACITE 2051 (15% solid solution | 58.33 |
| VINAC B-15 (20% solid solution) | 16.25 |
| SR 351 (TMPTA) | 0 |
| SR 454 (TEOTA-3) | 7.35 |
| SR 9035 (TEOTA-15) | 4.90 |
| IGRACURE ® 184 | 0.75 |
| methyl ethyl ketone | 12.42 |

Composition #5 was prepared and tested as described above. The coating did not crack after embossing or flexing and displayed marginal stability.

Composition #6:

| Ingredient | Parts by Weight |
|---|---|
| ELVACITE 2051 (15% solid solution) | 58.33 |
| VINAC B-15 (20% solid solution) | 16.25 |
| SR 351 (TMPTA) | 0 |
| SR 454 (TEOTA-3) | 9.19 |
| SR 9035 (TEOTA-15) | 3.06 |
| IGRACURE ® 184 | 0.75 |
| methyl ethyl ketone | 12.42 |

Composition #6 was prepared and tested as described above. No cracking was observed after embossing or flexing. The coating displayed good stability and plasticizer/chemical resistance.

Composition #7:

| Ingredient | Parts by Weight |
|---|---|
| ELVACITE 2051 (15% solid solution) | 58.33 |
| VINAC B-15 (20% solid solution) | 16.25 |
| SR 351 (TMPTA) | 0 |
| SR 454 (TEOTA-3) | 10.41 |
| SR 9035 (TEOTA-15) | 1.84 |
| IGRACURE ® 184 | 0.75 |
| methyl ethyl ketone | 12.42 |

Composition #7 was prepared and tested as described above. The coating cracked slightly after emboss and/or flexing but displayed acceptable stability and plasticizer/chemical resistance.

In conclusion, the ratio of monomers having differing degrees of ethoxylation (hard and flexible monomers) is important for optimum flexibility, stability and resistance to plasticizers. A preferred ratio of hard:flexible monomers (TEOTA-3: TEOTA-15) is from 1:1 to 5.66:1; more preferably 1.5:1 to 4:1; most preferably 1.85:1 to 3.5:1.

What is claimed is:

1. A topcoat film useable in preparing a stable data carrying device, said topcoat film comprising a topcoat layer, said topcoat layer formed from a topcoat composition comprising:
    (a) polymerizable composition comprising hard and flexible polymerizable subunits, wherein
        (i) the hard subunit comprises alkoxylated trimethylolpropane triacrylate with a degree of alkoxylation ranging from about 1 to about 10;
        (ii) the flexible subunit comprises alkoxylated trimethylolpropane triacrylate with a degree of alkoxylation ranging from about 10 to about 20; and
        (iii) the ratio of hard to flexible subunits in the composition is from about 1.5:1 to about 4:1;and
    (b) polymeric binder;
wherein the topcoat composition is substantially plasticizer free; and wherein the ratio by weight of polymerizable composition to polymeric binder is between 0.75:1 and 1.50:1 inclusive.

2. A stable data carrying device comprising:
    (a) a polymeric substrate; and
    (b) a topcoat layer, said topcoat layer formed from a topcoat composition comprising:
        (i) polymerizable composition comprising hard and flexible polymerizable subunits, wherein
            (a) the hard subunit comprises alkoxylated trimethylolpropane triacrylate with a degree of alkoxylation ranging from about 1 to about 10;
            (b) the flexible subunit comprises alkoxylated trimethylolpropane triacrylate with a degree of alkoxylation ranging from about 10 to about 20; and
            (c) the ratio of hard to flexible subunits in the composition is from about 1.5:1 to about 4:1; and
        (ii) polymeric binder;
wherein the ratio by weight of the polymerizable composition to the polymeric binder is between 0.75:1 and 1.50:1 inclusive; and wherein the topcoat layer is substantially plasticizer free.

3. A method for preparing a topcoat film useable in preparing a stable data carrying device, said method comprising steps of:
    (a) providing a topcoat composition, said composition comprising:
        (i) polymerizable composition comprising hard and flexible polymerizable subunits, wherein
            (a) the hard subunit comprises alkoxylated trimethylolpropane triacrylate with a degree of alkoxylation ranging from about 1 to about 10:
            (b) the flexible subunit comprises alkoxylated trimethylolpropane triacrylate with a degree of alkoxylation ranging from about 10 to about 20; and
            (c) the ratio of hard to flexible subunits in the composition is from about 1.5:1 to about 4:1; and
        (ii) polymeric binder;
wherein the topcoat composition is substantially plasticizer free and wherein the ratio by weight of the polymerizable composition to the binder is between 0.75:1 and 1.50:1 inclusive;
    (b) applying the topcoat composition to a base film; and
    (c) forming a topcoat layer.

4. The method of claim 3, wherein the base film has a first surface having a release coat thereon and a second surface to which the topcoat composition is applied.

5. The method of claim 3, further comprising the step of laminating a cover film to the topcoat layer.

6. The method of claim 3, farther comprising the steps of applying a release layer to base film before applying the topcoat composition, applying the topcoat composition to the release layer to form a topcoat layer, and laminating a cover film to the topcoat layer.

7. A method for preparing a stable data carrying device, said method comprising steps of:
  (a) providing a topcoat film, said step of providing the film comprising:
    (i) providing a topcoat composition, said composition comprising: polymerizable composition comprising hard and flexible polymerizable subunits, wherein
      (a) the hard subunit comprises alkoxylated trimethylolpropane triacrylate with a degree of alkoxylation ranging from about 1 to about 10;
      (b) the flexible subunit comprises alkoxylated trimethylolpropane triacrylate with a degree of alkoxylation ranging from about 10 to about 20; and
      (c) the ratio of hard to flexible subunits in the composition is from about 1.5:1 to about 4:1; and polymeric binder;
  wherein the topcoat composition is substantially plasticizer free and wherein the ratio by weight of the polymerizable composition to the binder is between 0.75:1 and 1.50:1 inclusive; and
    (ii) applying the topcoat composition to a base film forming a topcoat layer on the base film;
  (b) providing a polymeric substrate useable in a data carrying device;
  (c) laminating the topcoat film to the polymeric substrate such that the topcoat layer is adjacent to the polymeric substrate forming a topcoated polymeric substrate;
  (d) removing the base film from the polymeric substrate; and
  (e) curing the topcoated polymeric substrate.

8. A method for protecting printed matter on a data carrying device, the method comprising steps of:
  (a) providing a polymeric substrate useable in a data carrying device, said substrate having dye diffusion printed matter or thermal transfer printed matter on at least one surface;
  (b) providing a topcoat film, said step of providing the film comprising:
    (i) providing a topcoat composition, said composition comprising: polymerizable composition comprising hard and flexible polymerizable subunits, wherein
      (a) the hard subunit comprises alkoxylated trimethylolpropane triacrylate with a degree of alkoxylation ranging from about 1 to about 10:
      (b) the flexible subunit comprises alkoxylated trimethylolpropane triacrylate with a degree of alkoxylation ranging from about 10 to about 20; and
      (c) the ratio of hard to flexible subunits in the composition is from about 1.5:1 to about 4:1; and polymeric binder;
  wherein the topcoat composition is substantially plasticizer free and wherein the ratio by weight of the polymeric composition to the binder is between 0.75:1 and 1.50:1 inclusive; and
    (ii) applying the topcoat composition to a base film forming a topcoat layer on the base film;
  (c) laminating the topcoat film to the polymeric substrate in such a maimer that the topcoat layer is adjacent to the polymeric substrate forming a topcoated polymeric substrate;
  (d) curing the topcoated polymeric substrate; and
  (e) removing the base film from the topcoated polymeric substrate.

* * * * *